(12) United States Patent
Patel et al.

(10) Patent No.: US 10,049,118 B2
(45) Date of Patent: Aug. 14, 2018

(54) CONSISTENCY CHECKER FOR GLOBAL DE-DUPLICATION CLUSTERED FILE SYSTEM

(71) Applicant: NetApp, Inc., Sunnyvale, CA (US)

(72) Inventors: Dhaval Patel, Sunnyvale, CA (US); Chaitanya Patel, Morrisville, NC (US); John Muth, Scotts Valley, CA (US); Srinath Krishnamachari, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 480 days.

(21) Appl. No.: 14/727,005

(22) Filed: Jun. 1, 2015

(65) Prior Publication Data

US 2016/0350358 A1    Dec. 1, 2016

(51) Int. Cl.
*G06F 17/30*    (2006.01)

(52) U.S. Cl.
CPC .............................. *G06F 17/30156* (2013.01)

(58) Field of Classification Search
CPC .................... G96F 17/30371; G96F 17/30156
See application file for complete search history.

(56) References Cited

U.S. PATENT DOCUMENTS

| | | | |
|---|---|---|---|
| 7,454,592 B1 * | 11/2008 | Shah | G06F 11/1453 711/216 |
| 8,806,115 B1 | 8/2014 | Patel et al. | |
| 8,880,787 B1 | 11/2014 | Kimmel et al. | |
| 8,996,535 B1 | 3/2015 | Kimmel et al. | |
| 2012/0290629 A1 * | 11/2012 | Beaverson | G06F 17/30094 707/827 |
| 2016/0070618 A1 | 3/2016 | Pundir et al. | |

* cited by examiner

*Primary Examiner* — Robert Beausoliel, Jr.
*Assistant Examiner* — Hau H Hoang
(74) *Attorney, Agent, or Firm* — Cesari & McKenna, LLP

(57) ABSTRACT

A cluster-wide consistency checker ensures that two file systems of a storage input/output (I/O) stack executing on each node of a cluster are self-consistent as well as consistent with respect to each other. The file systems include a deduplication file system and a host-facing file system that cooperate to provide a layered file system of the storage I/O stack. The deduplication file system is a log-structured file system managed by an extent store layer of the storage I/O stack, whereas the host-facing file system is managed by a volume layer of the stack. Illustratively, each log-structured file system implements a key-value store and cooperates with other nodes of the cluster to provide a cluster-wide (global) key-value store. The consistency checker verifies and/or fixes on-disk structures of the layered file system to ensure its consistency. To that end, the consistency checker may determine whether there are inconsistencies in the key-value store and, if so, reconciles those inconsistencies from a client (volume layer) perspective.

20 Claims, 15 Drawing Sheets

US 10,049,118 B2

CONSISTENCY CHECKER FOR GLOBAL DE-DUPLICATION CLUSTERED FILE SYSTEM

BACKGROUND

Technical Field

The present disclosure relates to storage systems and, more specifically, to a consistency checker for a global de-duplication file system of a clustered storage system.

Background Information

A storage system typically includes one or more storage devices, such as disks embodied as solid state drives (SSDs), into which information may be entered, and from which information may be obtained, as desired. The storage system may implement a high-level module, such as a file system, to logically organize the information stored on disk as storage containers, such as files or logical units (LUNs), of the on-disk file system. Each storage container may be implemented as a set of data structures, such as data blocks that store data for the storage containers and metadata blocks that describe the data of the storage containers. For example, the metadata may describe, e.g., identify, storage locations on the disks for the data. The storage system may also be configured for de-duplication of data to reduce an amount of storage capacity consumed by previously stored data.

A plurality of storage systems may be interconnected as a cluster and configured to provide a global-deduplication file system. As a global file system, a failure to any storage system of the cluster may render the on-disk file system inconsistent. Accordingly, it is desirable to provide an efficient workflow to validate and/or fix the data structures of the file system to ensure self-consistency in a timely manner.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
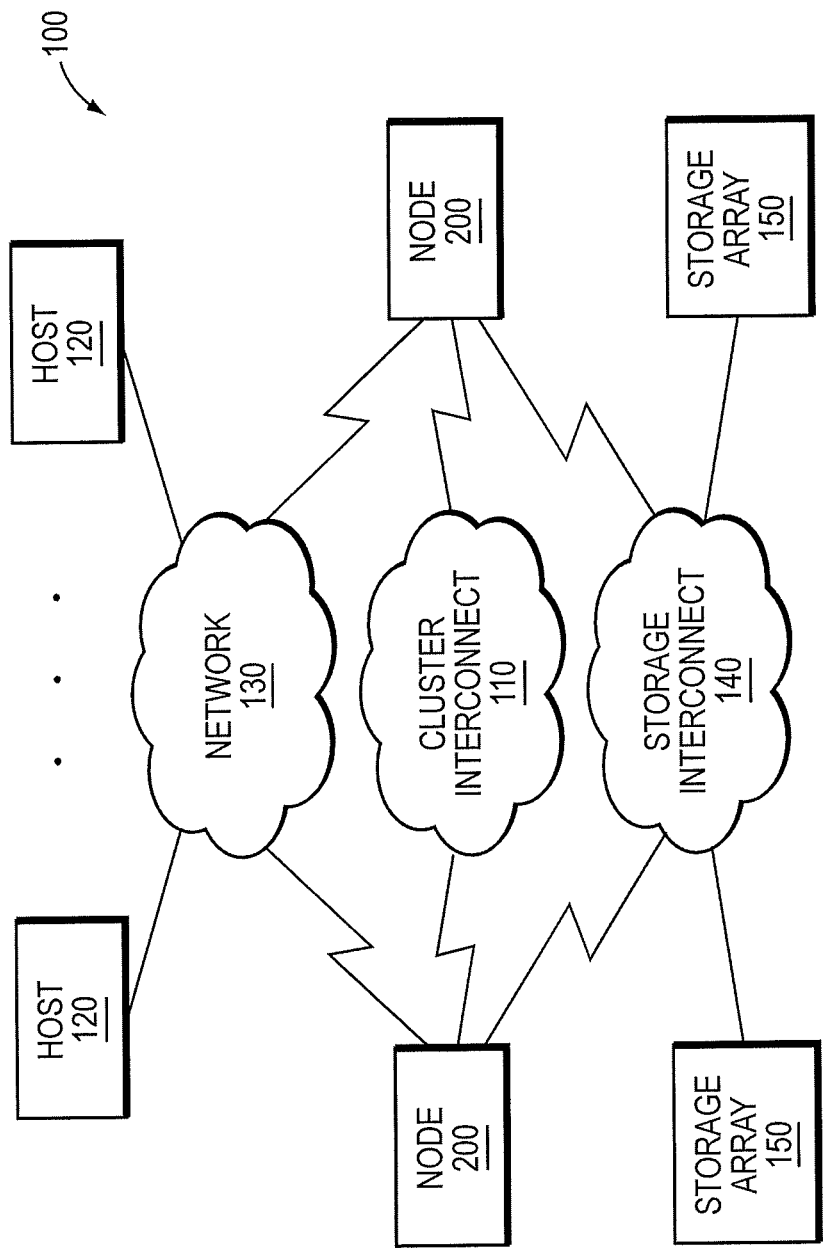
FIG. 1 is a block diagram of a plurality of nodes interconnected as a cluster.

The embodiments described herein are directed to a cluster-wide consistency checker configured to ensure that each layer of a layered file system of a storage input/output (I/O) stack executing on each node of a cluster is self-consistent and that the layers are consistent with respect to each other. The layered file system may include a deduplication file system and a host-facing file system that cooperate to provide the layered file system of the storage I/O stack. The deduplication file system is illustratively a log-structured file system managed by an extent store layer of the storage I/O stack (i.e., an extent store file system), whereas the host-facing file system is managed by a volume layer of the stack (i.e., a volume layer file system). Illustratively, each log-structured file system implements metadata used to identify and locate extents on storage devices as a key-value store (embodied as a hash table) and cooperates with other nodes of the cluster to provide a cluster-wide (global) key-value store. The volume layer of each node in the cluster is a client of the extent store layer (and global key-value store) that serves client requests.

Illustratively, the consistency checker verifies and/or fixes (i.e., repairs) on-disk structures of the layered file system as a whole to ensure its consistency. To that end, the consistency checker may first determine and fix any self-inconsistencies in each extent store file system (i.e. key-value store) and in each volume layer file system. The consistency checker may then reconcile any subsequent inconsistencies (e.g., space leaks, underflow of reference counts, or out-of-scope keys) between the volume layer and extent store layer file systems using a Map Reducer Engine (MRE) that fixes references to the keys from the volume layer (i.e., client) perspective. Illustratively, the cluster-wide consistency checker operates off-line, i.e., in a mode where the layered file system is not processing host I/O requests.

In an embodiment, the consistency checker resolves the inconsistencies in the layered file system in accordance with a consistency checker technique that is invoked in response to a failure of a node in the cluster. As a result of the node failure, the on-disk layered file system, i.e., the extent store file system (ESFS) and the volume layer file system (FS), may be inconsistent. Accordingly, the consistency checker may implement the technique to verify and repair each layered file system by: (i) verifying and/or fixing on-disk data structures of the ESFS for the affected (failed) node as well as replaying logs of each ESFS stored in non-volatile random access memory (NVRAM) and on-disk (ESFS NVlogs) to thereby render the respective ESFS self-consistent; and (ii) verifying and/or fixing on-disk structures of each volume layer FS, as well as replaying the logs of the volume layer stored in NVRAM and on-disk (volume layer FS NVlogs) to thereby render the respective volume layer FS self-consistent. During ESFS self-consistency checking, all extents in the hash tables may be read to discover any out-of-scope extents and, during volume layer FS self-consistency checking, the consistency checker may perform cluster-wide file system checks to resolve any out-of-scope extents that were discovered. For example, the volume layer may perform checks to each volume layer FS to repair dense trees and reference count structures, based on the checked (and now self-consistent) ESFS.

The consistency checker technique may then invoke the MRE to reconcile inconsistencies between keys that each volume layer FS and the ESFS may have identified, e.g., to correct mismatches in reference counts. Illustratively, for every volume layer FS serviced by a node, all keys in its dense trees including metadata and user data keys are published to Map Reduce (MR) bins of the MRE. Illustratively, each key found during traversal of the dense tree and reference count (refcount) log is published as a "make reference" (MKREF), e.g., +1, to the MRE. That is, the MRE accumulates (in the MR bins) all references in the volume layer FS and reference count log. In an embodiment, the refcount log is illustratively a deferred update log. Accordingly, each MKREF recorded in the refcount log is published to the MRE as, e.g., -1, because it is a deferred increment of a reference count already updated in the volume layer FS, but as yet unapplied to the ESFS. Conversely, every deletion or un-reference (UNREF) recorded in the refcount log is published as, e.g., +1, to the MRE. After the volume layers of all nodes are finished publishing their keys, a merge operation is performed of all MR bins to provide a view of each key's reference count to the ESFS storing the key and its associated extent. The consistency checker then reconciles any remaining inconsistencies by applying the client's (volume layer's) perspective of each key's reference count to the ESFS' perspective, and fixing (i.e., repairing) the ESFS perspective of the reference counts with respect to the client's (i.e., volume layer FS) perspective.

In an embodiment, NV logs of a persistence layer of the storage I/O stack may be replayed after establishing self-consistency in the volume layer and completing reconciliation. Note that replay of the persistency layer NV logs is desirable because the persistence layer functions as a cache of host (user) data, which should not be discarded. After replaying the persistence layer NV logs (in NVRAM and on-disk) the cluster-wide, layered file system consistency check may be declared complete.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
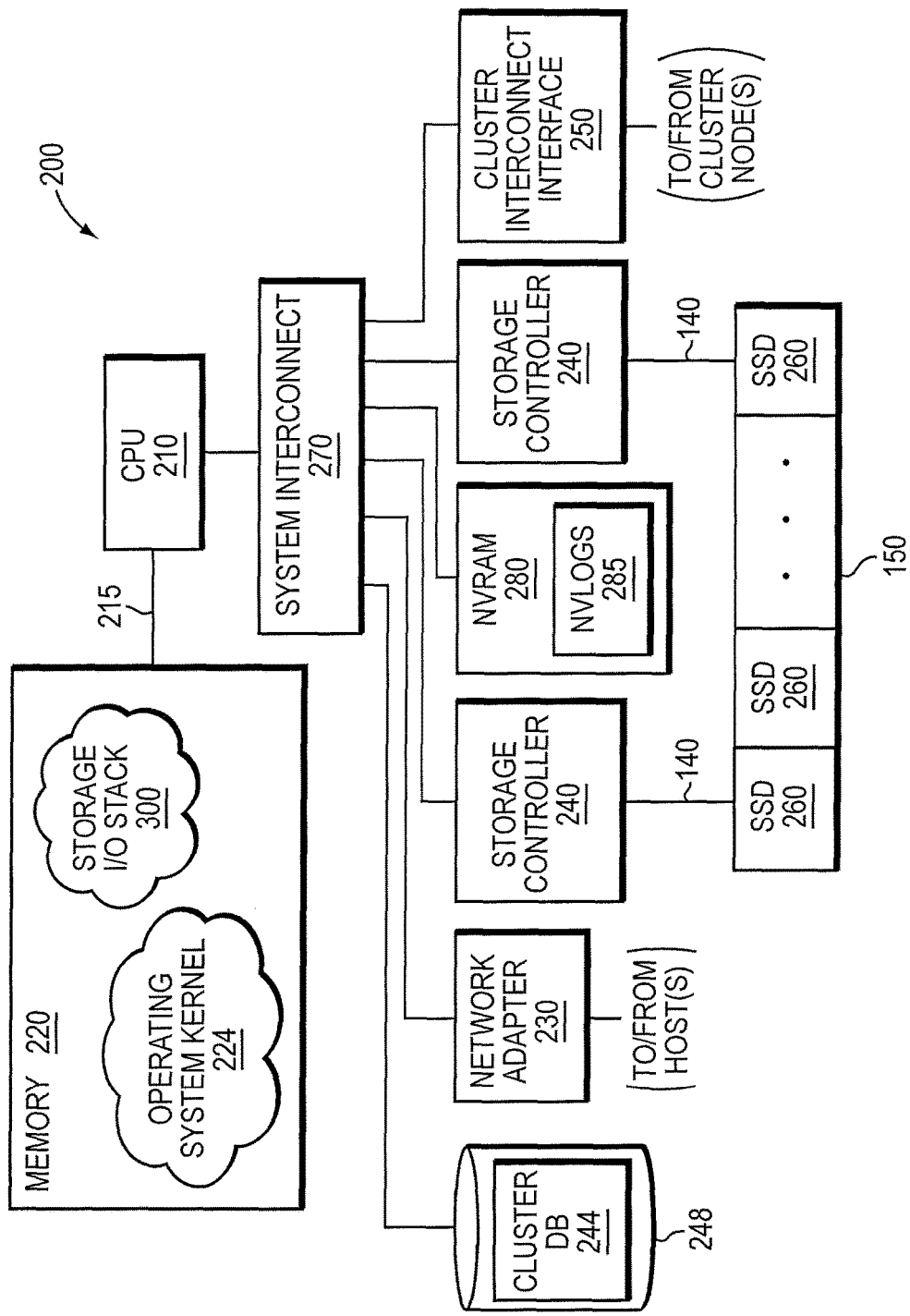
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
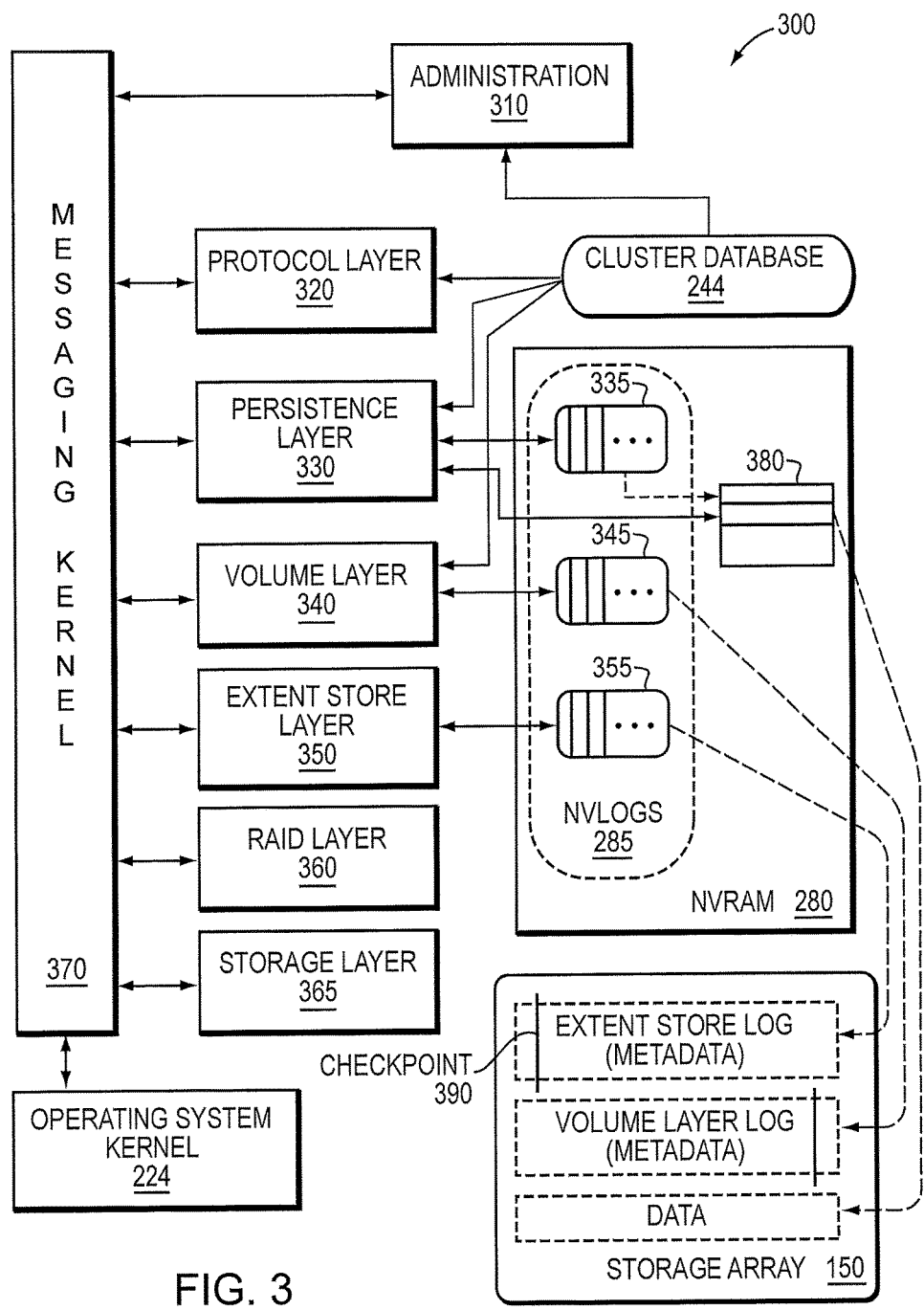
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache 380 may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
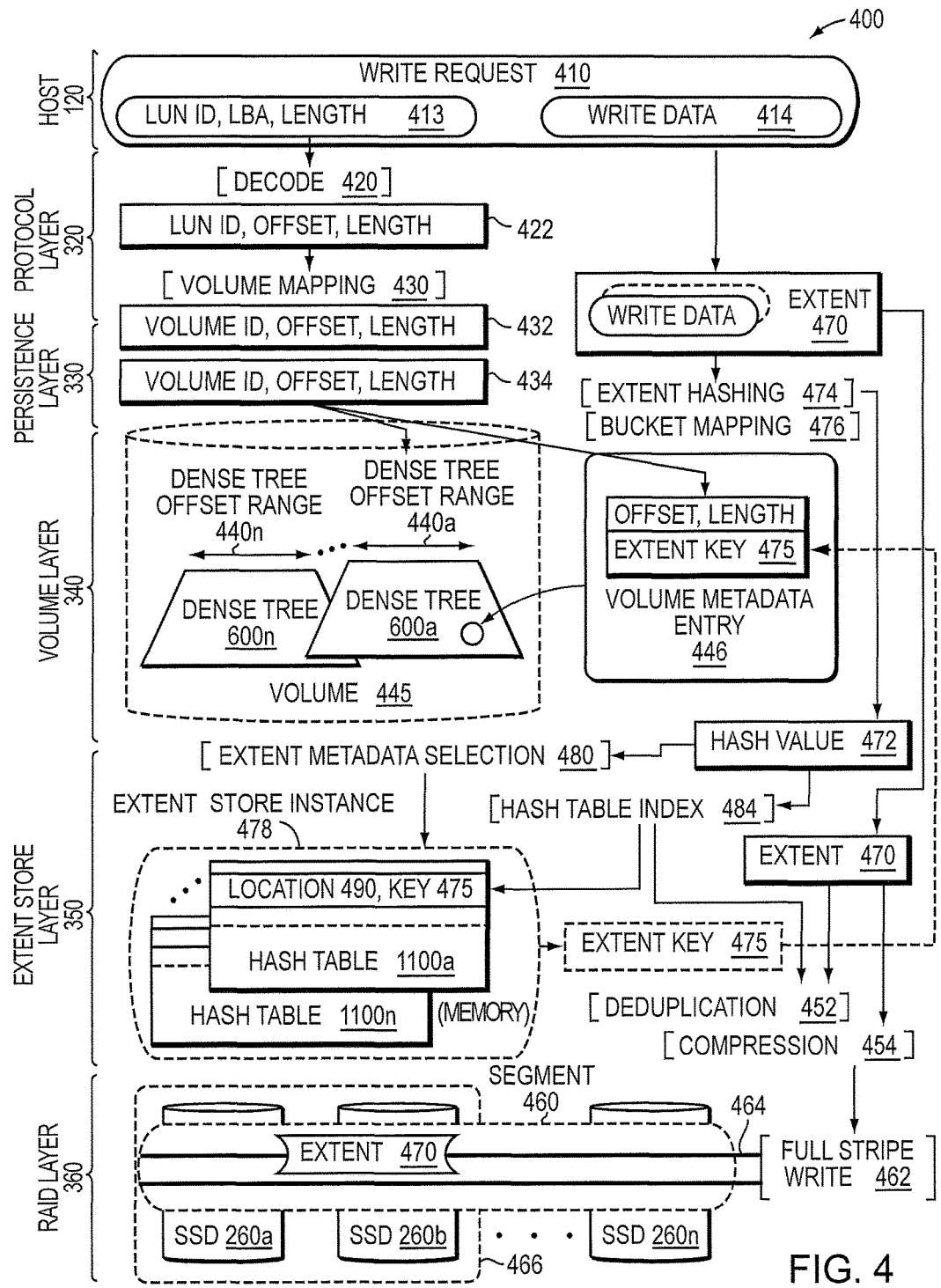
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write date including, e.g., the volume ID, offset and length, as parameters 434 of a message to the appropriate volume layer instance. In an embodiment, message passing of the parameters 434 (received by the persistent layer) may be redirected to another node via the function shipping mechanism, e.g., RPC, for inter-node communication. Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 1100 (e.g., hash table 1100a) from a set of hash tables (illustratively in-core) within the extent store instance 478, and (ii) extracts a hash table index 484 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 480. If a table entry with a matching extent key is found, then the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 475 of the existing extent is passed to the appropriate volume layer instance for storage within an entry (denoted as volume metadata entry 446) of a dense tree metadata structure (e.g., dense tree 600a), such that the extent key 475 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 1100n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 1100n (i.e., as selected by the new candidate extent key), (ii) passes a new extent key (denoted as extent key 475) to the appropriate volume layer instance for storage within an entry (also denoted as volume metadata entry 446) of a dense tree 600 managed by that volume layer instance, and (iii) records a change to extent metadata of the selected hash table in the extent store layer log 355. Illustratively, the volume layer instance selects dense tree 600a spanning an offset range 440a of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 600. The volume layer instance then inserts the volume metadata entry 446 into the dense tree 600a and records a change corresponding to the volume metadata entry in the volume layer log 345. Accordingly, the I/O (write) request is sufficiently stored on SSD 260 of the cluster.

Read Path

Figure 5:
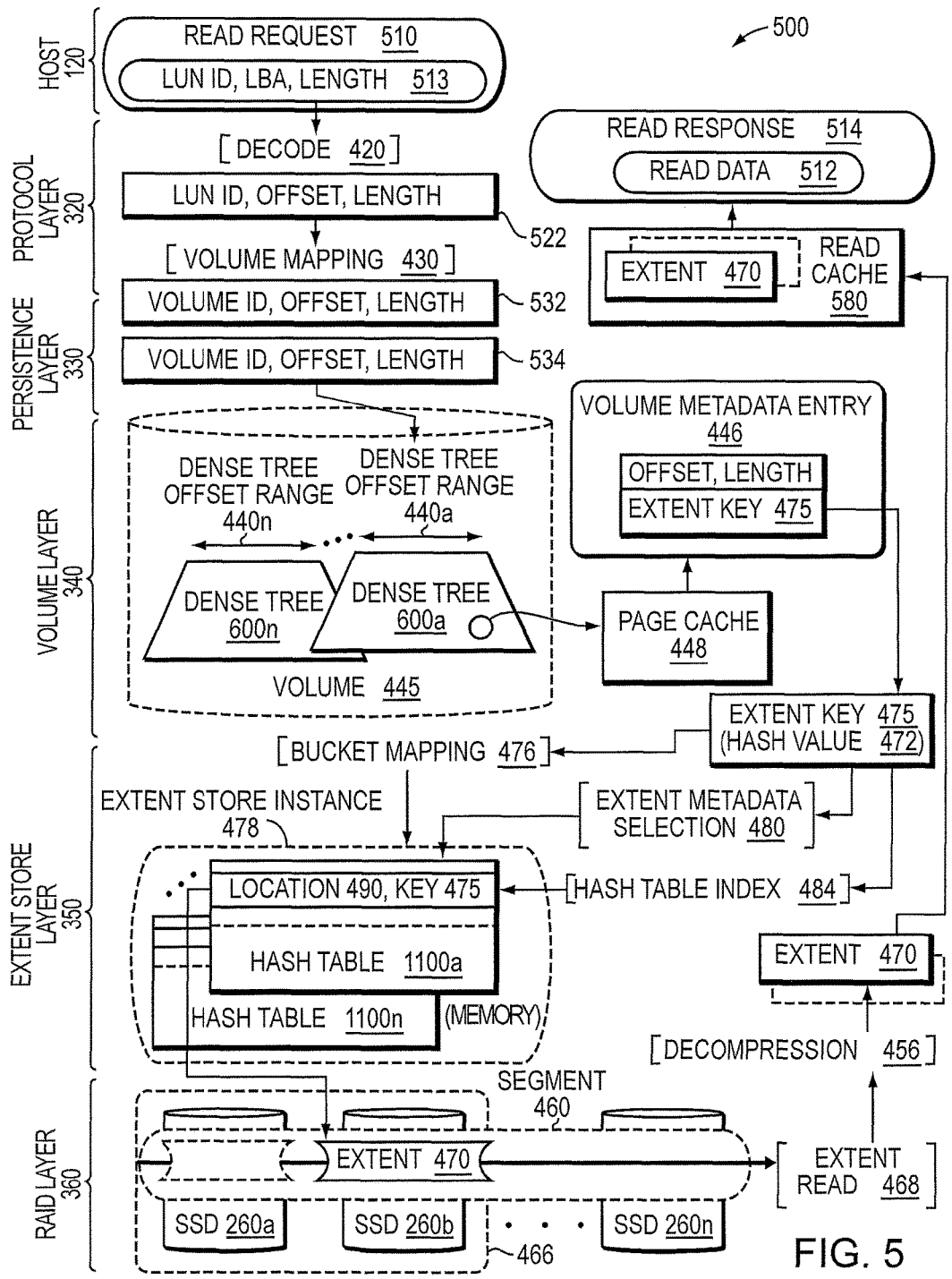
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 600a) associated with a region (e.g., offset range 440a) of a volume 445 that encompasses the requested offset range (specified by parameters 534). The volume layer instance may further process the read request to search for (lookup) one or more volume metadata entries 446 of the dense tree 600a to obtain one or more extent keys 475 associated with one or more extents 470 within the requested offset range. As described further herein, each dense tree 600 may be embodied as a multiple levels of a search structure with possibly overlapping offset range entries at each level. The entries, i.e., volume metadata entries 446, provide mappings from host-accessible LUN addresses, i.e., LBAs, to durable extent keys. The various levels of the dense tree may have volume metadata entries 446 for the same offset, in which case the higher level has the newer entry and is used to service the read request. A top level of the dense tree 600 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 475 for the entire requested read range are found. If no metadata entries exist for the entire or portions of the requested read range, then the missing portion(s) are zero filled.

Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 480 that (i) selects an appropriate hash table (e.g., hash table 1100a) from a set of hash tables within the extent store instance 478, and (ii) extracts a hash table index 484 from the extent key 475 (i.e., hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260b). The extent store instance then cooperates with the RAID storage layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 446) as a data structure, i.e., a dense tree metadata structure (dense tree 600), which maps an offset range within the region to one or more extent keys. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
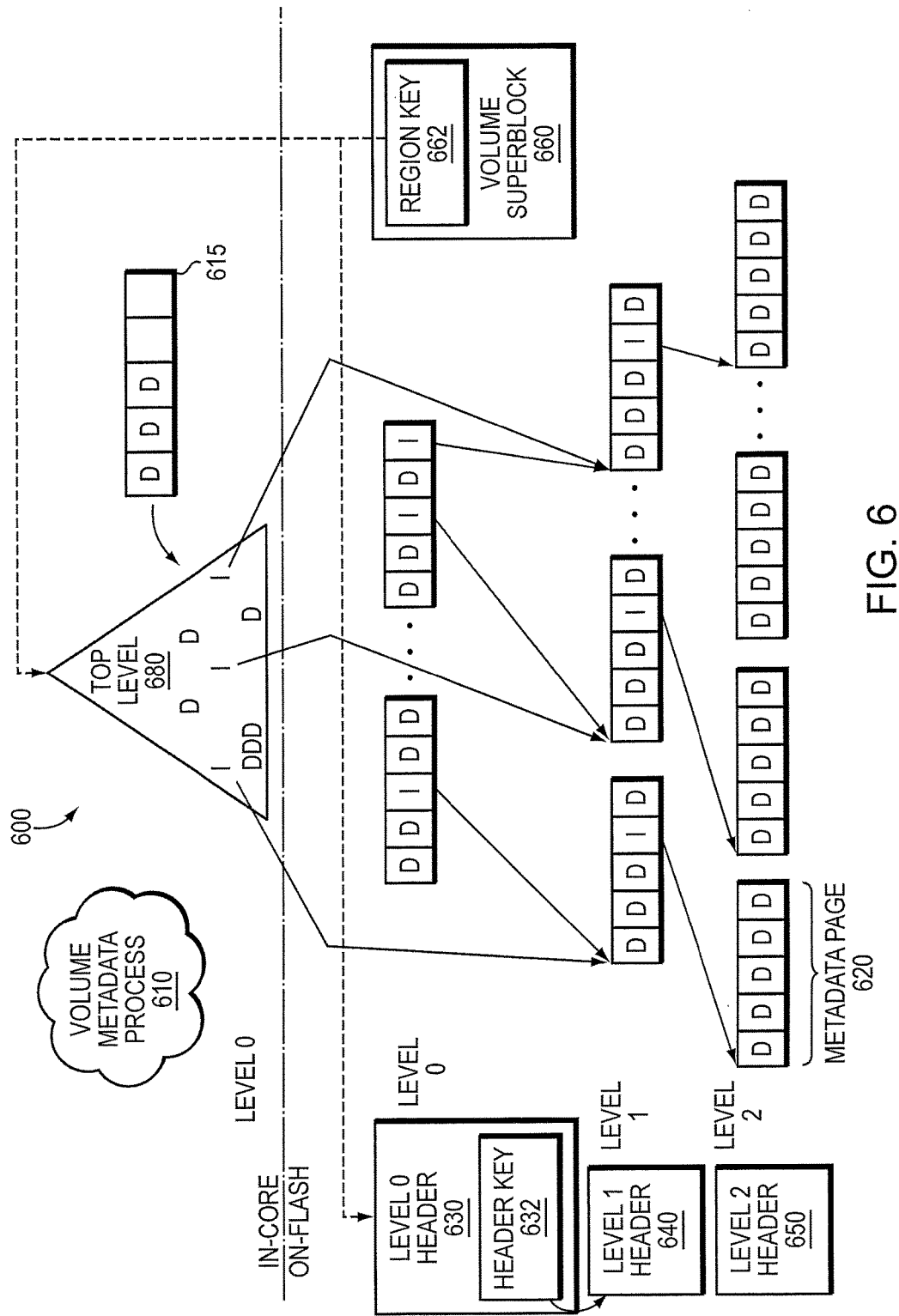
FIG. 6 is a block diagram of a dense tree metadata structure.

FIG. 6 is a block diagram of the dense tree metadata structure that may be advantageously used with one or more embodiments described herein. The dense tree metadata structure 600 is configured to provide mappings of logical offsets within a LUN (or volume) to extent keys managed by one or more extent store instances. Illustratively, the dense tree metadata structure is organized as a multi-level dense tree 600, where a top level 680 represents recent volume metadata changes and subsequent descending levels represent older changes. Specifically, a higher level of the dense tree 600 is updated first and, when that level fills, an adjacent lower level is updated, e.g., via a merge operation. A latest version of the changes may be searched starting at the top level of the dense tree and working down to the descending levels. Each level of the dense tree 600 includes fixed size records or entries, i.e., volume metadata entries 446, for storing the volume metadata. A volume metadata process 610 illustratively maintains the top level 680 of the dense tree in memory (in-core) as a balanced tree that enables indexing by offsets. The volume metadata process 610 also maintains a fixed sized (e.g., 4 KB) in-core buffer as a staging area (i.e., an in-core staging buffer 615) for volume metadata entries 446 inserted into the balanced tree (i.e., top level 680). Each level of the dense tree is further maintained on-flash as a packed array of volume metadata entries, wherein the entries are stored as extents illustratively organized as fixed sized (e.g., 4 KB) metadata pages 620. Notably, the staging buffer 615 is de-staged to SSD upon a trigger, e.g., the staging buffer full. Each metadata page 620 has a unique identifier (ID), which guarantees that no two metadata pages can have the same content. Illustratively, metadata may not be de-duplicated by the extent store layer 350.

In an embodiment, the multi-level dense tree 600 includes three (3) levels, although it will be apparent to those skilled in the art that additional levels N of the dense tree may be included depending on parameters (e.g., size) of the dense tree configuration. Illustratively, the top level 680 of the tree is maintained in-core as level 0 and the lower levels are maintained on-flash as levels 1 and 2. In addition, copies of the volume metadata entries 446 stored in staging buffer 615 may also be maintained on-flash as, e.g., a level 0 linked list. A leaf level, e.g., level 2, of the dense tree contains data entries (D), whereas a non-leaf level, e.g., level 0 or 1, may contain both data entries and index entries. Each index entry (I) at level N of the tree is configured to point to (reference) a metadata page 620 at level N+1 of the tree. Each level of the dense tree 600 also includes a header (e.g., level 0 header 630, level 1 header 640 and level 2 header 650) that contains per level information, such as reference counts associated with the extents. Each upper level header contains a header key (an extent key for the header, e.g., header key 632 of level 0 header 630) to a corresponding lower level header. A region key 662 to a root, e.g., level 0 header 630 (and top level 680), of the dense tree 600 is illustratively stored on-flash and maintained in a volume root extent, e.g., a volume superblock 660. Notably, the volume superblock 660 contains region keys to the roots of the dense tree metadata structures for all regions in a volume. Further, the header of each level 630, 640, 650 may include a magic number and checksum (not shown), which may be used for verifying the data structure as described later herein.

Dense Tree Volume Metadata Checkpointing

When a level of the dense tree 600 is full, volume metadata entries 446 of the level are merged with the next lower level of the dense tree. As part of the merge, new index entries (I) are created in the level to point to new lower level metadata pages 620, i.e., data entries from the level are merged (and pushed) to the lower level so that they may be "replaced" with an index reference in the level. The top level 680 (i.e., level 0) of the dense tree 600 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 600 is the ratio K of the size of level N-1 to the size of level N. Illustratively, the size of the array at level N is K times larger than the size of the array at level N-1, i.e., sizeof(level N)=K*sizeof(level N-1). After K merges from level N-1, level N becomes full (i.e., all entries from a new, fully-populated level N-1 are merged with level N, iterated K times.)

Figure 7:
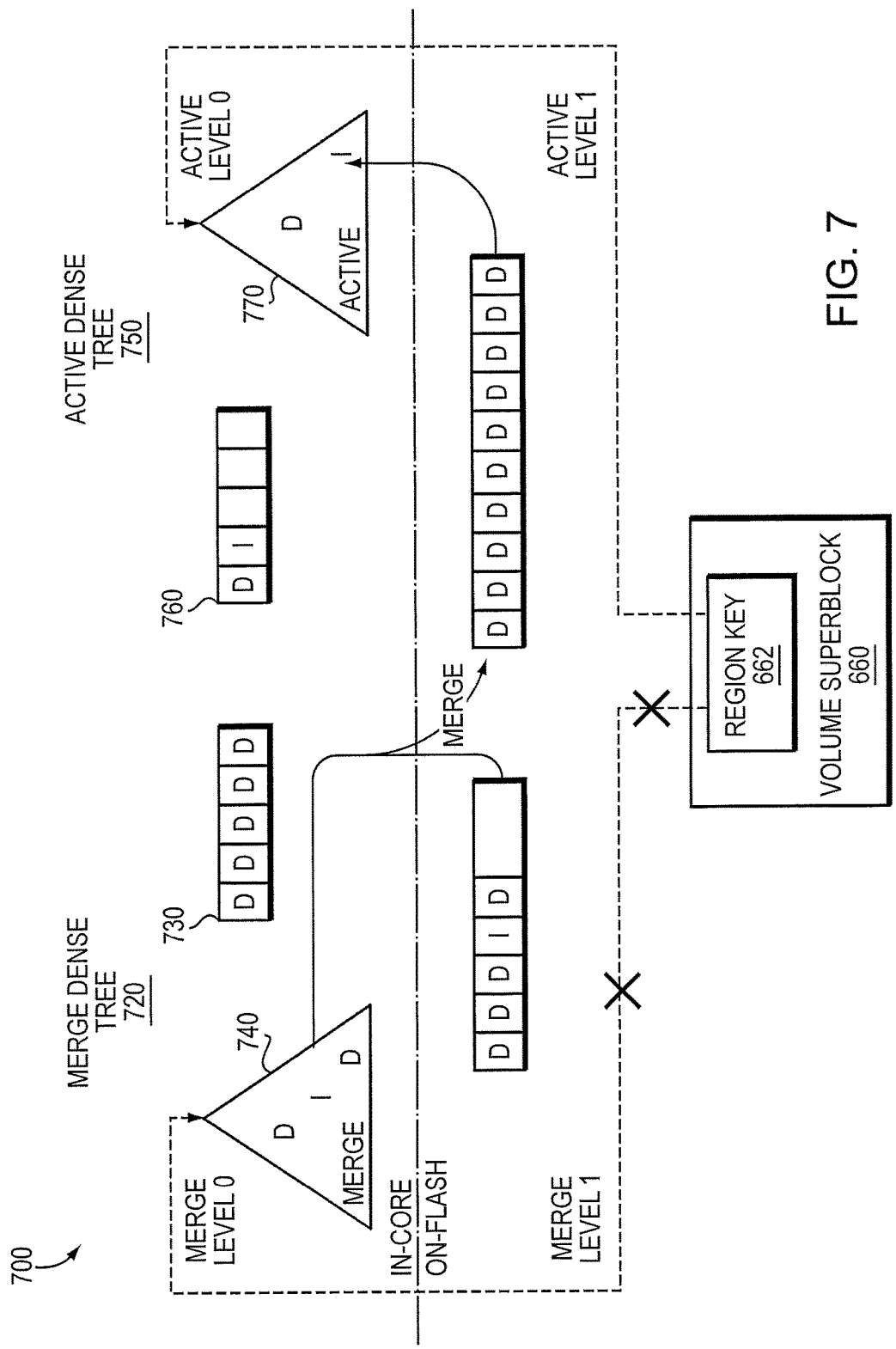
FIG. 7 illustrates merging between levels of the dense tree metadata structure.

FIG. 7 illustrates merging 700 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 720) that merges, while an alternate "active" dense tree structure (shown at 750) is utilized to accept incoming data. Accordingly, two in-core level 0 staging buffers 730, 760 are illustratively maintained for concurrent merge and active (write) operations, respectively. In other words, an active staging buffer 760 and active top level 770 of active dense tree 750 handle in-progress data flow (i.e., active user read and write requests), while a merge staging buffer 730 and merge top level 740 of merge dense tree 720 handle consistency of the data during a merge operation. That is, a "double buffer" arrangement may be used to handle the merge of data (i.e., entries in the level 0 of the dense tree) while processing active operations.

During the merge operation, the merge staging buffer 730, as well as the top level 740 and lower level array (e.g., merge level 1) are read-only and are not modified. The active staging buffer 760 is configured to accept the incoming (user) data, i.e., the volume metadata entries received from new put operations are loaded into the active staging buffer 760 and added to the top level 770 of the active dense tree 750. Illustratively, merging from level 0 to level 1 within the merge dense tree 720 results in creation of a new active level 1 for the active dense tree 750, i.e., the resulting merged level 1 from the merge dense tree is inserted as a new level 1 into the active dense tree. A new index entry I is computed to reference the new active level 1 and the new index entry I is loaded into the active staging buffer 760 (as well as in the active top level 770). Upon completion of the merge, the region key 662 of volume superblock 660 is updated to reference (point to) the root, e.g., active top level 770 and active level 0 header (not shown), of the active dense tree 750, thereby deleting (i.e., rendering inactive) merge level 0 and merge level 1 of the merge dense tree 720. The merge staging buffer 730 (and the top level 740 of the dense tree) thus becomes an empty inactive buffer until the next merge. The merge data structures (i.e., the merge dense tree 720 including staging buffer 730) may be maintained in-core and "swapped" as the active data structures at the next merge (i.e., "double buffered").

Figure 8:
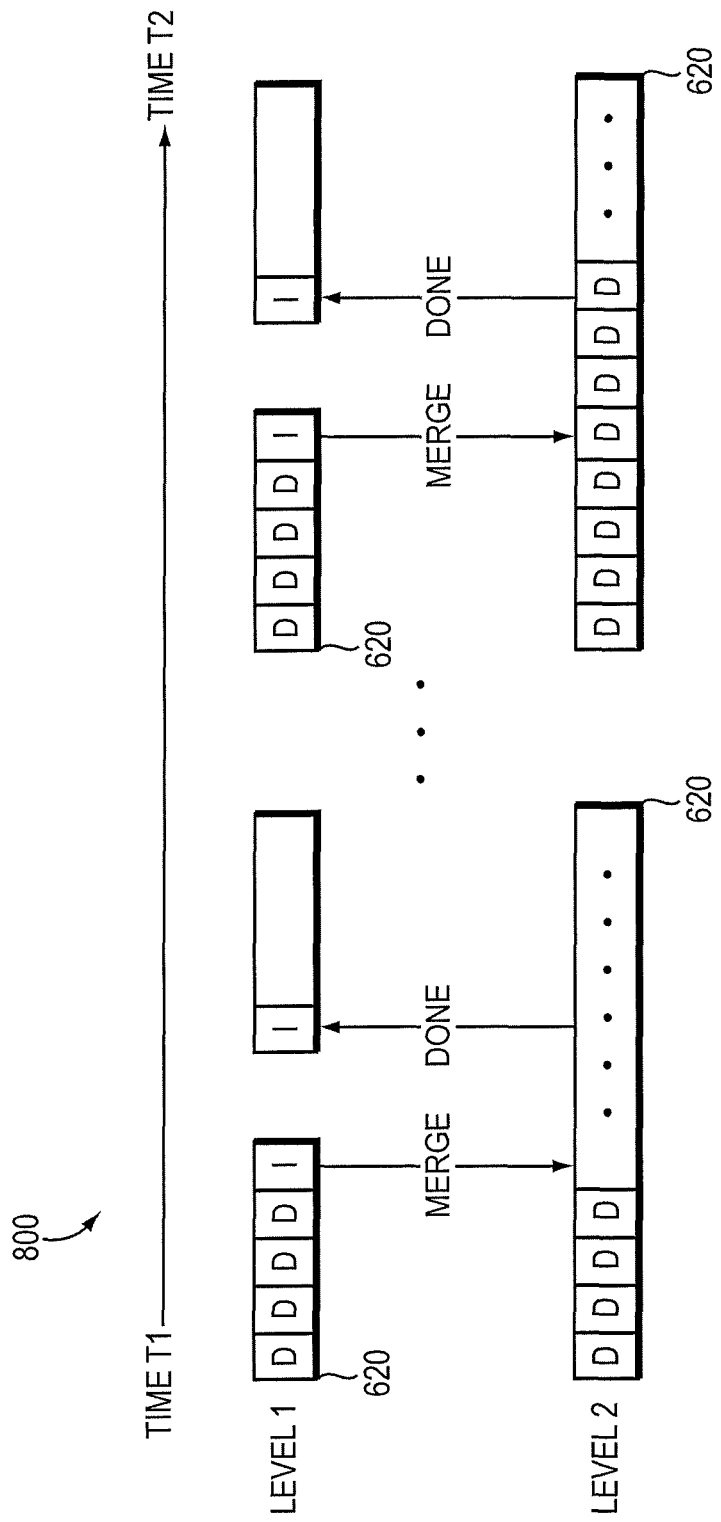
FIG. 8 illustrates batch updating between levels of the dense tree metadata structure.

FIG. 8 illustrates batch updating 800 between lower levels, e.g., levels 1 and 2, of the dense tree metadata structure. Illustratively, as an example, a metadata page 620 of level 1 includes four data entries D and an index entry I referencing a metadata page 620 of level 2. When full, level 1 batch updates (merges) to level 2, thus emptying the data entries D of level 1, i.e., contiguous data entries are combined (merged) and pushed to the next lower level with a reference inserted in their place in the level. The merge of changes of layer 1 into layer 2 illustratively produces a new set of extents on SSD, i.e., new metadata pages are also stored, illustratively, in an extent store instance. As noted, level 2 is illustratively several times larger, e.g., K times larger, than level 1 so that it can support multiple merges. Each time a merge is performed, some older entries that were previously on SSD may be deleted. Advantageously, use of the multi-level tree structure lowers the overall frequency of volume metadata that is rewritten (and hence reduces write amplification), because old metadata may be maintained on a level while new metadata is accumulated in that level until it is full. Further, when a plurality of upper levels become full, a multi-way merge to a lower level may be performed (e.g., a three-way merge from full levels 0 and 1 to level 2).

Dense Tree Volume Metadata Logging

In an embodiment, the volume layer log 345 is a two level, append-only logging structure, wherein the first level is NVRAM 280 (embodied as NVLogs 285) and the second level is SSD 260, e.g., stored as extents. New volume metadata entries 446 inserted into level 0 of the dense tree are also recorded in the volume layer log 345 of NVLogs 285. When there are sufficient entries in the volume layer log 345, e.g., when the log 345 is full or exceeds a threshold, the volume metadata entries are flushed (written) from log 345 to SSD 260 as one or more extents 470. Multiple extents may be linked together with the volume superblock 660 holding a key (i.e., an extent key) to the head of the list. In the case of recovery, the volume layer log 345 is read back to memory 220 to reconstruct the in-core top level 680 (i.e., level 0) of dense tree 600. Other levels may be demand paged via the page cache 448, e.g., metadata pages of level 1 are loaded and read as needed.

Figure 9:
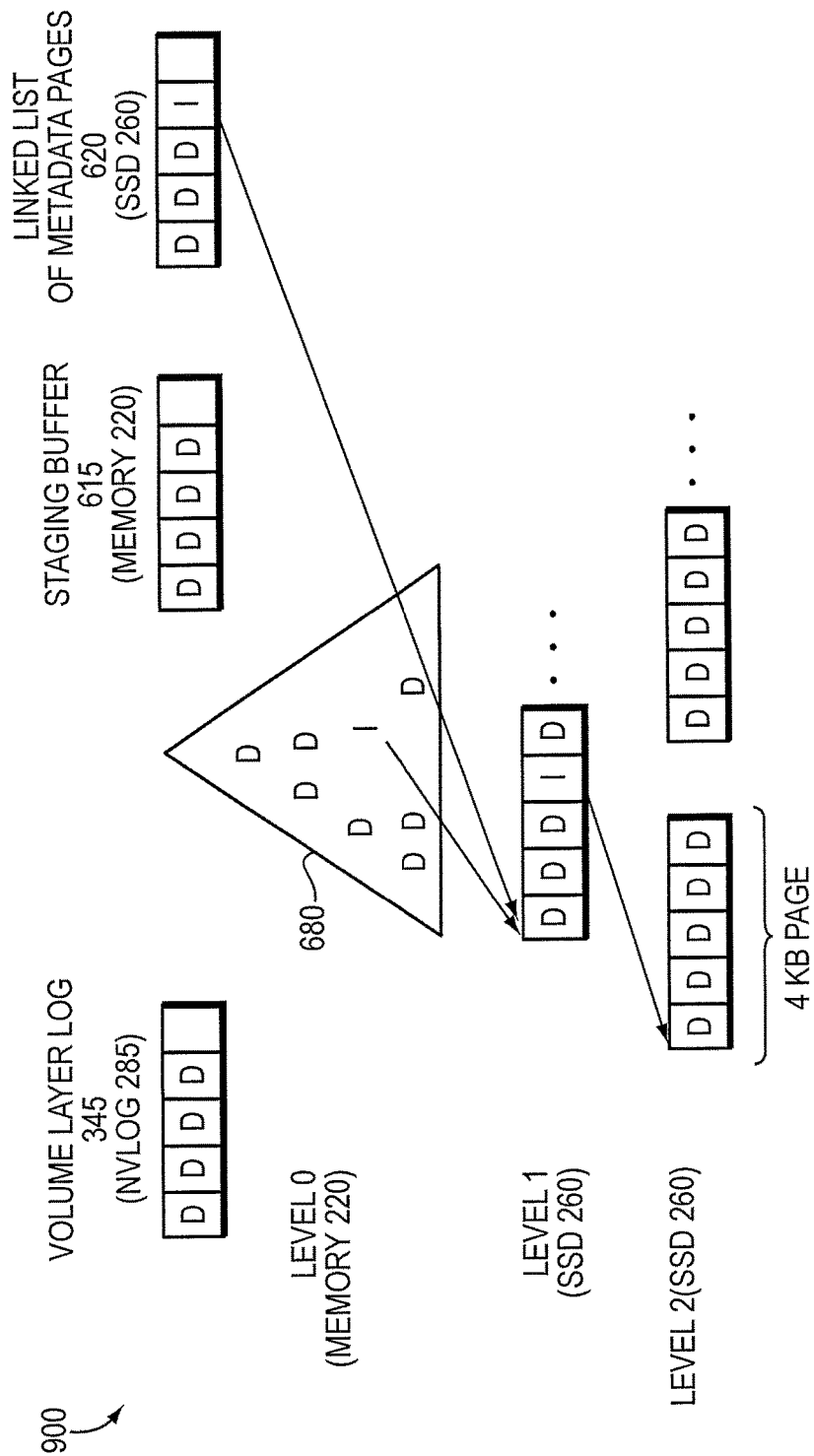
FIG. 9 illustrates volume logging of the dense tree metadata structure.

FIG. 9 illustrates volume logging 900 of the dense tree metadata structure. Copies of the volume metadata entries 446 stored in level 0 of the dense tree are maintained in persistent storage (SSD 260) and recorded as volume layer log 345 in, e.g., NVLogs 285. Specifically, the entries of level 0 are stored in the in-core staging buffer 615, logged in the append log (volume layer log 345) of NVLogs 285 and thereafter flushed to SSD 260 as a linked list of metadata pages 620. Copies of the level 0 volume metadata are maintained in-core as the active dense tree level 0 so as to service incoming read requests from memory 220. Illustratively, the in-core top level 680 (e.g., active dense tree level 770) may be used as a cache (for hot metadata), whereas the volume metadata stored on the other lower levels of the dense tree are accessed less frequently (cold data) and maintained on SSD. Alternatively, the lower levels also may be cached using the page cache 448.

Deferred Reference Count Update

In an embodiment, a deferred reference count update technique efficiently frees storage space for metadata (associated with data) to be deleted during a merge operation managed by the volume layer. As previously noted, the metadata is illustratively volume metadata embodied as mappings from LBAs of a LUN to extent keys maintained by the extent store layer. The volume layer organizes the volume metadata as a mapping data structure, i.e., a multi-level dense tree, where each level of the dense tree may include volume metadata entries for storing the volume metadata. Each level of the dense tree includes one or more metadata pages, each of which contains multiple volume metadata entries that provide the mappings from the host-accessible LBAs to the extent keys. Each metadata page is also stored as an extent and, thus, includes a page key (e.g., an extent key). When a level of the dense tree is full, the existing volume metadata entries of the level are merged with the next lower level of the dense tree. As part of the merge, new index entries are created in the level to point to new lower level metadata pages, i.e., data entries from the level are merged (and pushed) to the lower level so that they may be replaced with an index reference in the level. As a result, the existing (i.e., older) volume metadata entries of the level are no longer needed and, thus, are subject to deletion. That is, the metadata pages having the older (i.e., merged and no longer needed) volume metadata entries may be deleted. Notably, a merger of any entry in a metadata page renders that metadata page subject to deletion.

The extent store layer illustratively maintains a reference count on each key (e.g., page key or extent key); accordingly, a reference count (refcount) log may be employed to both delete (decrement) the refcount of the key and de-duplicate (increment) the refcount of the key. Note that refcount increments may occur as a result of volume metadata updates, such as overwrites and snapshot splitting. Illustratively, refcount increments may be processed during the merge operation, whereas refcount decrements (deletes) are deferred until the merge operation completes so as to permit simplified rollback and re-start of the merge operation. Note further that persistent storage of the page keys for deletion in the refcount log (as a separate, out-of-band data structure) enables low-overhead, i.e., does not consume much storage space on SSD when persisting the deletions in the refcount log.

In an embodiment snapshots and clones of volumes may be represented as independent volumes accessible by a host as LUNs, and embodied as respective read-only copies, i.e., snapshots, and read-write copies, i.e., clones, of the volume associated with the LBA range. Illustratively, each snapshot/clone may be derived from a dense tree of the parent volume (parent dense tree) to thereby enable fast and efficient snapshot/clone creation in terms of time and consumption of metadata storage space. To that end, portions (e.g., levels or volume metadata entries) of the parent dense tree may be shared with the snapshot/clone to support time and space efficiency of the snapshot/clone, i.e., portions of the parent volume divergent from the snapshot/clone volume are not shared. As used herein, volumes that share dense trees (or portions thereof) are members of a volume family (VF), and such VF members may use the same refcount log for shared dense trees (or portions thereof). Further, a level reference counter (refcount) (not shown) may be maintained for each level (i.e., portion) of the dense tree, illustratively within a respective level header 630, 640, 650 to track sharing of levels between the volumes (i.e., between the parent volume and snapshot/clone). Illustratively, the level refcount may increment when levels are shared and decremented when levels are split (e.g., copied). For example, a level refcount value of 1 may indicate an unshared level (i.e., portion) between the volumes (i.e., has only one reference). In an embodiment, volume metadata entries of a dense tree do not store data, but only reference data (as extents) stored on the storage array 150 (e.g., on SSDs 260). Consequently, more than one level of a dense tree may reference the same extent (data) even when the level refcount is 1. This may result from a split (i.e., copy) of a dense tree level brought about by creation of the snapshot/clone. Accordingly, a separate reference count is maintained for each extent in the extent store layer to track sharing of extents among volumes.

Figure 10:
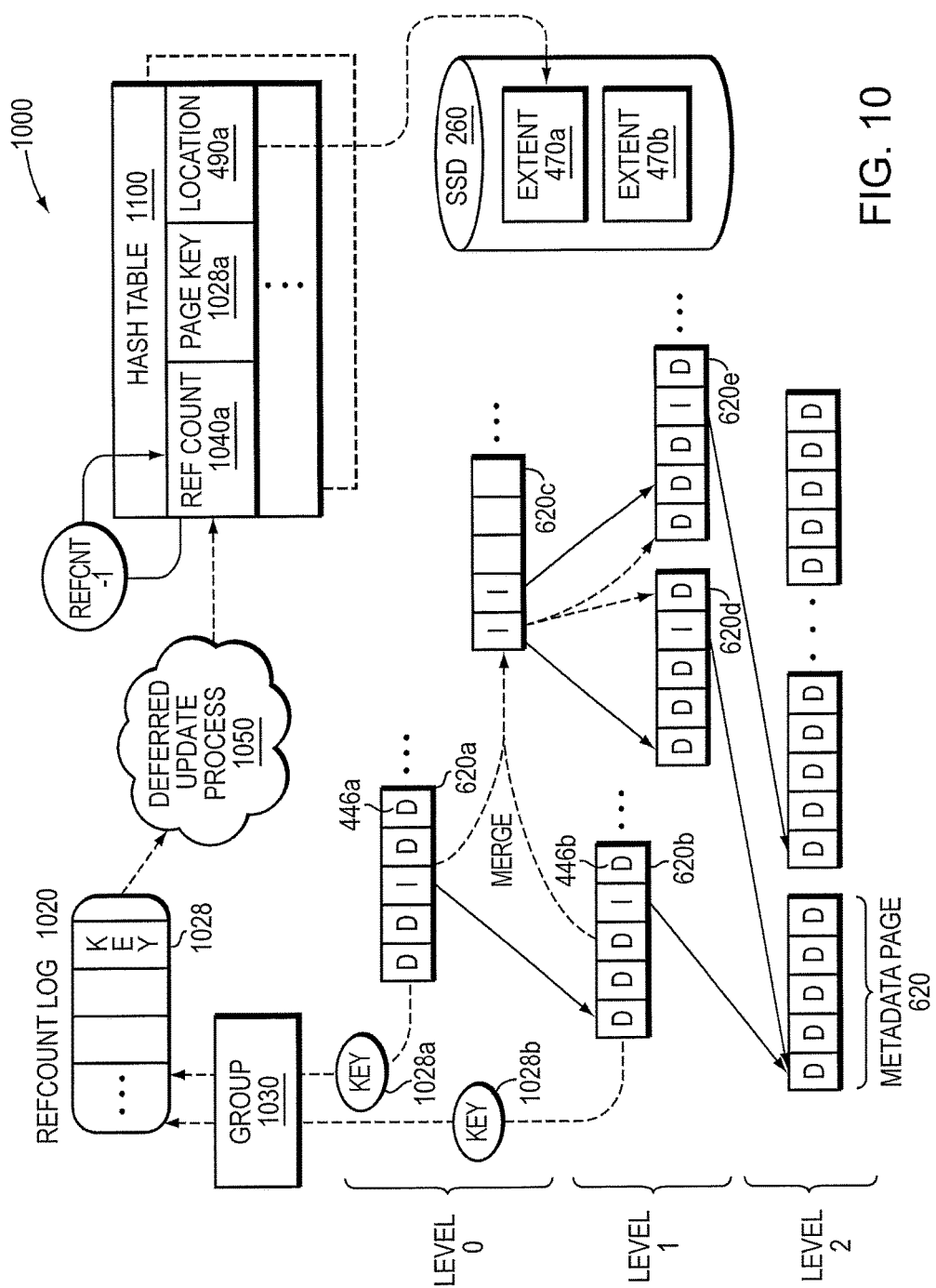
FIG. 10 illustrates a deferred reference count update technique.

FIG. 10 illustrates the deferred reference count update technique 1000 which may apply to deletion of the entire LUN or portion of the LUN, including overwrite of the LBA range (i.e., offset range) within the LUN, wherein one or more existing volume metadata entries 446 (i.e., LBA-to-extent key mappings) are deleted. According to the deferred reference count update technique, one or more requests to delete volume metadata entries 446a,b may be represented as page (metadata) keys 1028a,b associated with metadata pages 620a,b having those volume metadata entries during the merge operation. Accordingly, the storage space associated with those metadata pages may be freed in an out-ofband fashion (i.e., not during the merge). Illustratively, the page keys 1028*a,b* of the metadata pages 620*a,b* may be persistently recorded in a set of data structures embodied as a refcount log 1020 (e.g., a circular log) to thereby allow the merge operation to complete without resolving deletion (e.g., reference count reduction) of the keys (and, thus, freeing of the space of the extents 470*a,b* on SSD storing the metadata pages 620*a,b* associated with the page keys 1028*a,b*). Note that key deletion may occur when a reference count 1040*a* associated with the page key 1028*a* reduces to a sentinel value (e.g., zero).

A batch (i.e., group) of page keys 1030 (i.e., associated with the metadata pages 620*a,b* to be deleted) may be organized as one or more delete requests and inserted into the refcount log 1020 by the volume layer in a manner that maintains concurrency. During the merge operation, existing metadata pages 620*a,b* of, e.g., a top level (metadata page 620*a*) and a next level (metadata page 620*b*) of the dense tree may be deleted and rewritten as new metadata pages 620*c, d, e*. The page keys of the batch 1030 of the existing metadata pages 620*a,b* may be organized, e.g., in memory, as one or more pending delete requests. Note that the reference count log may support increments (i.e., duplicates), e.g., "make reference" (MKREF), of pages as well as decrements (i.e., deletion requests), e.g., "unreference" (UNREF). Once the merge operation completes, the page keys 1028*a,b* of the delete requests may be inserted into the refcount log. That is, batches of one or more keys may be inserted into the refcount log per batch on a key-by-key basis. Subsequently, a deferred reference count update process 1050 may be spawned (instantiated) to "walk" through the page keys stored in the refcount log and delete (i.e., reference count reduce) each key, e.g., from the extent store layer 350, independently and out-of-band from the merge operation. Note also that only the key is needed for deletion in the extent store layer which need only dereference (i.e., dissociate) the key with the extent. Illustratively, the extent store layer may effect deletion (e.g., reference count of zero) for each key by clearing a corresponding entry in the hash table 1100, thereby dereferencing the extent (e.g., 470*a*) storing the metadata page (e.g., 620*a*) associated with the key (e.g., 1028*a*). Note further that locations of identical metadata pages (e.g., during restart of a merge operation) may also directly replace locations 490 in the hash tables 1100 associated with prior metadata pages and avoid extent hashing 474 (i.e., avoid hashing again the identical metadata page).

Cuckoo Hashing

Figure 11:
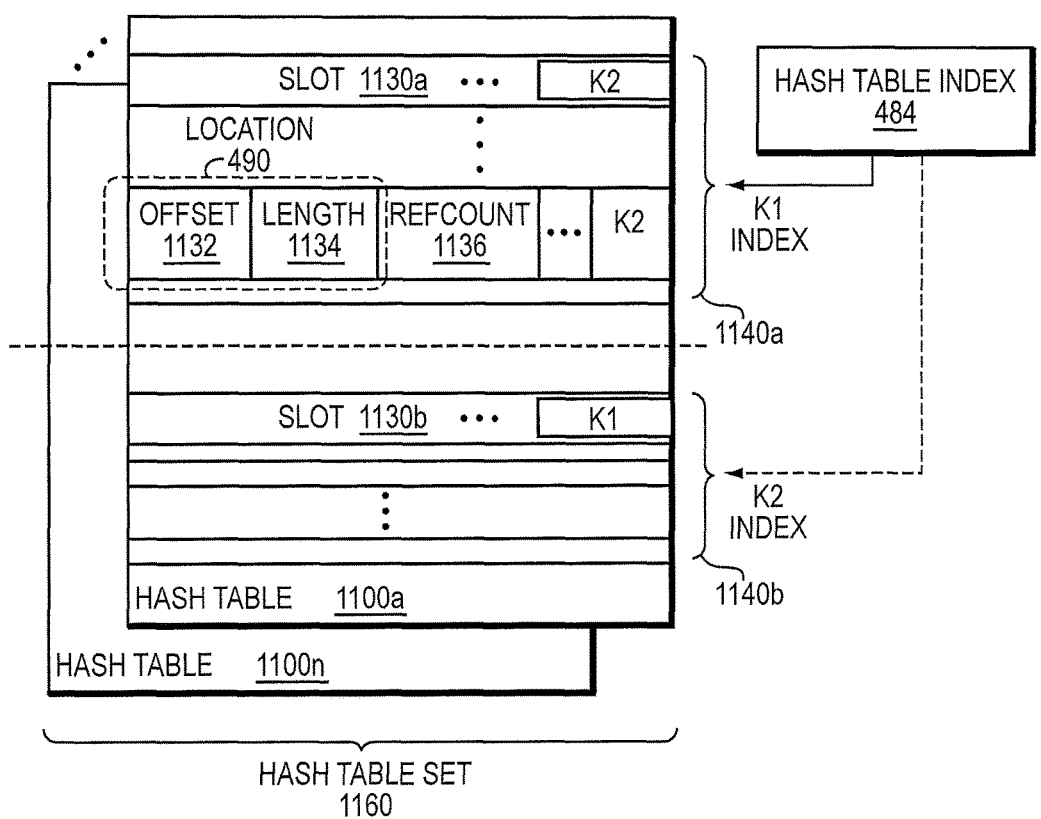
FIG. 11 is a block diagram of a cuckoo hash table.

In an embodiment, hashing may be used in a file system metadata arrangement that reduces an amount of metadata stored in the memory of a node in the cluster and that reduces the amount of metadata needed to process an I/O request at the node. Illustratively, the embodiments include cuckoo hashing and, in particular, a manner in which cuckoo hashing may be modified and applied to construct the file system metadata arrangement. In an embodiment, the file system metadata arrangement may be illustratively configured as a key-value extent store embodied as a data structure, e.g., a cuckoo hash table. FIG. 11 is a block diagram of a cuckoo hash table 1100 that may be advantageously used with one or more embodiments described herein. Illustratively, the extent metadata resides entirely in the memory 220 of each node 200 and is embodied as a hash table 1100*a-n* of a set of hash tables 1160 configured to address locations of the SSD. In an embodiment, there are illustratively 768 (3×256) hash tables in the hash table set 1160, wherein each hash table 1100 has a same size. A value, such as a hash table index 484, may be applied to the cuckoo hash table to obtain a key, such as an extent key 475, configured to reference a location 490 of an extent 470 on one or more storage devices, such as SSDs 260. Thus, the cuckoo hash table 1100 embodies extent metadata that describes the extent and, as such, may be organized to associate a location on SSD with an index, i.e., a value associated with the hash table index 484 identifies the location on SSD. Advantageously, the file system metadata arrangement achieves a high degree of metadata compactness, thus reducing read and write amplification as well as memory requirements.

In an embodiment, storage and retrieval of key-value pairs employ cuckoo hashing, i.e., the set of cuckoo hash tables, using a portion of the hash value 472 as the hash table index 484 (i.e., indexing into the cuckoo hash table), which key is illustratively split in half. Each half of the hash table index may be used as an index into each cuckoo hash table 1100 to determine a potential entry for storing the other half of the hash table index in the table. That is, one half of the hash table index 484 may be used as the index into the cuckoo hash table, while the other half may be used as the value stored in the hash table 1100. Alternatively, the other half of the hash table index may be used as the index, while the one half may be used as the stored value. Thus, the same hash table index 484 can be stored in the cuckoo hash table in two different ways, i.e., either in an upper half or lower half of the cuckoo hash table 1100. This allows higher population, i.e., load factor, in the hash table without chaining, e.g., the use of linked lists, by accessing an entry with the one half of the hash table index as the index and, if the entry occupied, accessing another entry with the other half of the hash table index as the index. Accordingly, cuckoo hashing reduces an amount of metadata (i.e., the hash table index) stored in the memory of the node as a result of a higher load factor. If both entries are occupied, then one of the two entries is chosen and the prior content of the entry may be evicted and re-inserted into the cuckoo table at an alternate location (i.e., alternate entry) using the prior content as an alternate index to the hash table, i.e., not resolving to either of the two entries. The hash table index 484, i.e., referencing the chosen entry, may then be stored at the alternate location. If the alternate location also is occupied, the prior content of the alternate entry may also be evicted. This eviction process may be repeated until an unoccupied entry is found.

However, as full capacity (i.e., load) of the hash table 1100 is approached, a cycle effect may be realized wherein two or more entries chain together through their present and alternate hash table locations to form a complete cycle; if this occurs, no new insertions can occur at any of these locations. To eliminate this problem, the cuckoo hash table embodies a set associative organization such that, for each entry 1140 that is indexed by half of the hash table index 484, there is a plurality of possible slots 1130 (i.e., a group of slots associated with the index) into which the other half of the hash table index may be inserted/stored, i.e., all of the slots are associated with the indexing hash table index (i.e., the hash table index used to index the group of slots), but each slot 1130 may include a different other half of the hash table index 484. Illustratively, each slot 1130 includes an offset 1132 and a length 1134 which are organized to indicate a location on SSD for an extent "keyed" by the slot; a reference count ("refcount" 1136) indicating a number of metadata references to the extent; and either "K1" or "K2" not used as the hash table index 484 to index to the entry 1140. Generally, a free slot of the plurality of possible slots may be found by linear search of the plurality of slots for the non-indexing half of the hash table index, i.e., if K1 indexes for the entry/slot, a search for K2 is performed. Alternatively, the associative set may be sorted permitting a more efficient search, e.g., a binary search, to be used.

In an embodiment, the cuckoo hash table 1100 may be organized with a 32-way set associativity, i.e., the hash table index stored in the cuckoo hash table may be found in any of 32 slots of the hash table indexed at the one half of the hash table index or any of 32 slots indexed by the other half of the hash table index. If an adequately uniform hash function is used, the distribution may be sufficiently balanced such that there may be unoccupied slots 1130 for a given hash value. That is, as long as the entire hash table is not full, one of the 64 potential slots for the hash table index is likely to be unoccupied so that the hash table index can be inserted into that slot. If all 64 slots are occupied, it is likely that one of the 64 occupants can be moved to an empty entry/slot without any further relocation. Note that every time contents are moved from one entry/slot to another in the hash tables, the corresponding hash table index 484 may be logged to record changes to the hash table. Advantageously, the 32-way set associativity may provide a load factor greater than 98%, so that values inserted into the hash table remain in the slots/entries and are not pushed out by the cuckoo hashing until the table is substantially full. By using the cuckoo hash, two possible entries for an extent key in the hash table can be directly computed and the 64 slots associated with the entries can be inspected, i.e., searched, to find the extent key. Illustratively, entries of the cuckoo hash table may be sized so that all 32 slots for the hash table index fit in a cache line of the CPU 210 enabling a fast linear search of the slots.

Extent Metadata Logging

Figure 12A:
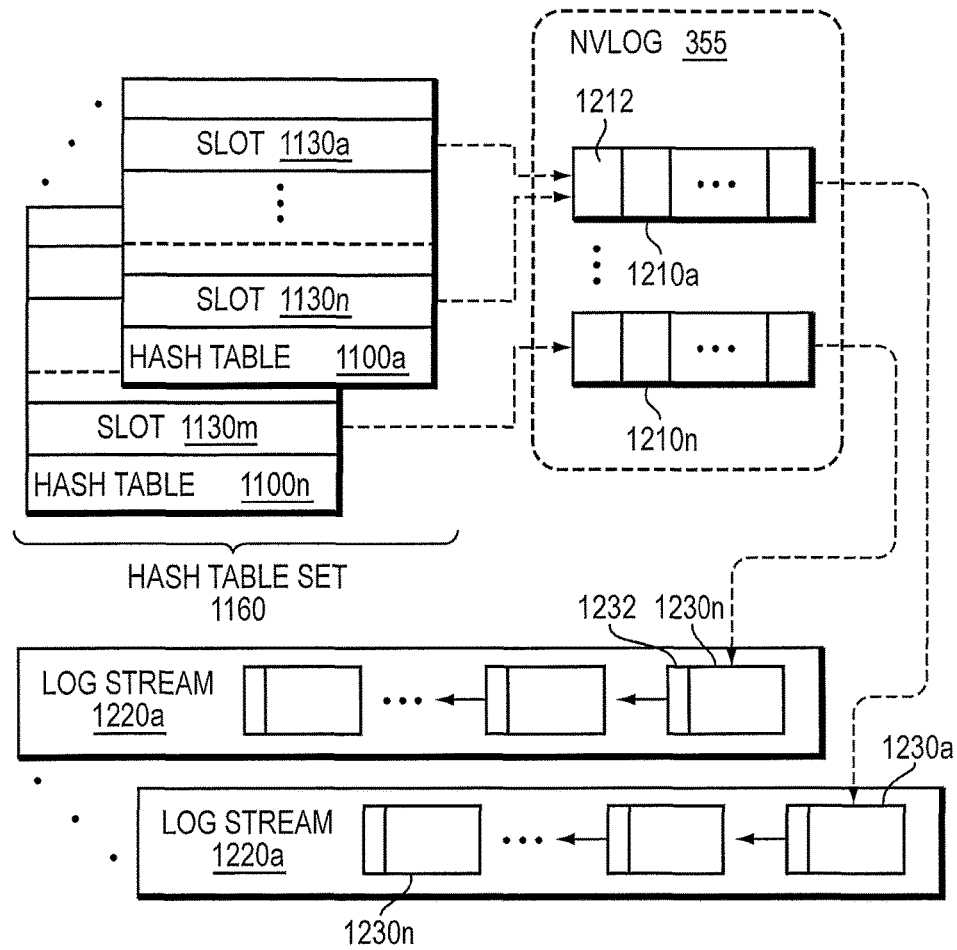
FIG. 12a is a block diagram of a hash table log stream.

FIG. 12*a* is a block diagram of a hash table log stream that may be advantageously used with one or more embodiments described herein. In an embodiment, changes to the set of hash tables 1160 are illustratively recorded as (e.g., appended to) a continuous stream of changes embodied as the extent store layer log 355 of the NVlogs 285. Illustratively, a separate log stream structure 1210 of the log 355 may be associated respectively with each hash table 1100 such that changed (i.e., dirtied) slots 1130 of the hash table are recorded as entries 1212 in the log stream structure 1210. That is, updates, i.e., changes, from the hash tables are stored in their corresponding log stream structures 1210 prior to storage on SSD. A copy (not shown) of the log stream structure 1210 may be stored in memory 220 (e.g., as an in-core buffer); in addition, previous contents of the log stream structure 1210 may be stored in a corresponding log stream 1220 on SSD. When the log stream structure 1210 grows large enough (e.g., to 8 KB) the in-core copy of the log stream structure 1210 may be written to its corresponding log stream 1220 (i.e., to SSD) as a log stream page 1230 (e.g., an 8 KB page update) in one operation, and a new in-core page may be created in memory 220 to receive further changes from the hash tables. Notably, the log stream structure 1210 may be implemented as a double buffer to accommodate writing to SSD (i.e., log stream 1220) while also recording entries 1212 to the log stream structure. The entries 1212 in the log stream structure 1210 may thereafter be discarded once it is confirmed that the corresponding page, i.e., log stream page 1230, safely written to SSD. Notably, the log stream 1220*a-n*, i.e., log stream pages 1230*a-n*, may be stored as extents of the extent store instance being logged without relying on that extent store instance's metadata, i.e., without using slots in the hash tables of that extent store instance to locate the log stream pages. Instead, a separate location mechanism may be used to locate the log stream pages. Illustratively, each log stream page 1230 may include a pointer 1232 indicating the location of a previous log stream page on SSD, i.e., reverse chronological order. Alternatively, the log stream pages may be located via an indexing structure (e.g., organizing the log in reverse chronological order) stored in the log stream 1220, e.g., at a known offset, such as at a log stream beginning.

In an embodiment, there may be 256 log streams, which number is illustratively determined based on the time needed for a node 200 to reboot. That is, given a reboot time threshold, e.g., one second, the number of log streams is determined so that the node may begin servicing requests from the volume layer within the reboot time threshold (i.e., a reboot time to service). During reboot, if there are too few log streams (e.g., too many log stream pages associated with each log stream), the aggregate log read rate may be inadequate, because it is desirable that the node be able to serially access each of the log streams. As a result, the node may not be able to meet the reboot time to service. Accordingly, an adequate number of log streams 1220 may be needed, e.g., spread across the SSDs, so that an aggregate read bandwidth of the SSDs is sufficient to meet the reboot time to service. It should be noted that the metadata, i.e., the hash table slots 830*a-n*, are approximately evenly distributed via the extent hashing technique 474, so that no log stream exceeds twice the average log stream size, which provides for evenly distributed read requests among the log streams during reboot to facilitate a low reboot time to service. Further, adequate available cluster resources may also permit multiple hash tables 1100 to be associated with each log stream 1220 as described by an expansion technique in U.S. Pat. No. 8,996,535 titled Extent Hash Structure for Distributed Storage Architecture, to Kimmel et al. issued Mar. 31, 2015 (e.g., increasing the number of hash tables associated with each log stream by three, so that tables 0-2 may map to the first log stream, tables 3-5 may map to the second log stream, etc.).

Figure 12B:
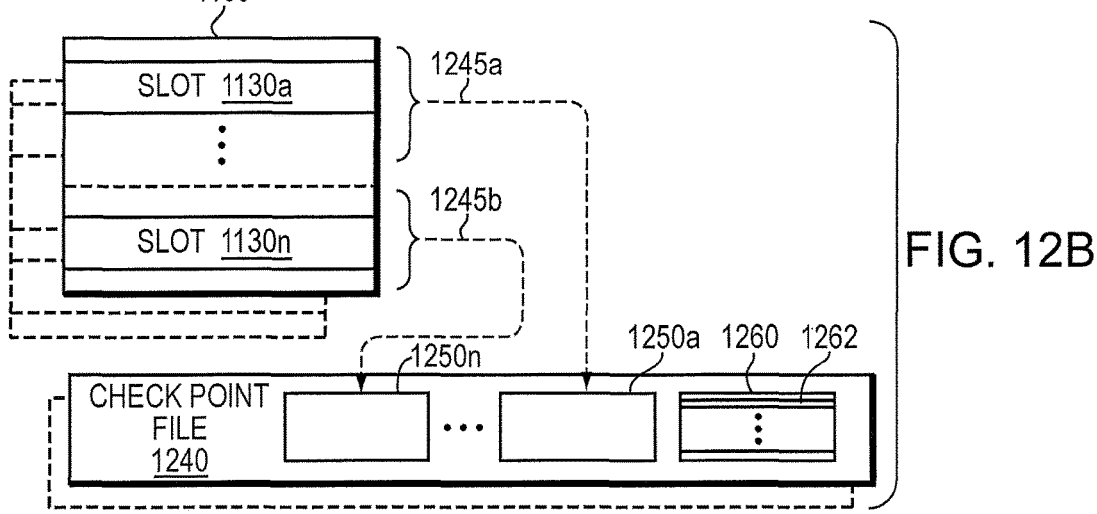
FIG. 12b is a block diagram of a hash table checkpoint file.

Organizing the log streams and hash tables in this fashion may provide locality of reference, so that all of the log entries 1212 in the log stream structures 1210*a-n* for each hash table may be directed to a respective single log stream 1220. Thus, a checkpoint of the metadata in each hash table, i.e., the slots 1130*a-n*, may be stored in a respective checkpoint file associated with that log stream. FIG. 12*b* is a block diagram of a hash table checkpoint file 1240 that may be advantageously used with one or more embodiments described herein. Slots 1130 of the hash table 1100 may be formed into groups 1245 and written as checkpoint having one or more checkpoint pages 1250 within the checkpoint file 1240. The checkpoint pages 1250 and log stream pages 1230 may include the same number of hash table slots and, thus, be of a same size, e.g., 8 KB. In this manner both logging and checkpointing of each hash table are independent of one another. Accordingly, the hash tables (and updates) may be segregated so that when a hash table (or group of hash tables) is associated with a particular CPU or thread of execution (i.e., each hash table has a processor affinity) no complicated locking is necessary to ensure the safety of multi-processing algorithms. For example, CPU 1 may be assigned hash tables 1-10, CPU 2 may be assigned tables 11-20, etc. Thus, an I/O request that is directed to hash table 1 may be processed by CPU 1 every time, so that there is no need for multiprocessor locking in order to achieve high throughput in a multiprocessing environment.

As with the log stream pages 1230 of the log streams, the checkpoint pages 1250 may be stored as extents of the extent store instance being logged without relying on that extent store instance's metadata, i.e., without using slots in the hash tables of that extent store instance to locate the checkpoint pages on SSD. Illustratively, an index table 1260 having index entries 1262 are stored in the checkpoint file 1240, e.g., at a known offset. The index entries 1262 may locate, e.g., as offsets, the checkpoint pages 1250 in the checkpoint file 1240. In alternate embodiments, the checkpoint may include any number of hash tables up to the entire in-core hash table set 1160.

Layered File System

In an embodiment, the volume layer and extent store layer form a layered file system of the storage I/O stack. A log-structured layer (i.e., extent store layer) of the file system provides sequential storage of data and metadata (i.e., log-structured layout) on the SSDs 260 of the cluster to reduce write amplification, while leveraging the variable compression and variable length extent features, as well as the extent de-duplication feature, of the storage I/O stack 300. The data may be organized as an arbitrary number of variable-length extents of one or more host-visible LUNs served by the nodes and stored as extents. The metadata may include mappings from host-visible logical block address ranges (i.e., offset ranges) of a LUN to extent keys (e.g., volume layer metadata), as well as mappings of the extent keys to SSD storage locations of the extents (e.g., extent store layer metadata). Illustratively, the volume layer cooperates with the extent store layer to provide a level of indirection that facilitates efficient log-structured layout of extents on the SSDs by the extent store layer. That is, the extent key mappings maintained by the volume layer allow relocation of the extents on SSD during, e.g., segment cleaning, without update to the volume layer mappings. Accordingly, the storage location of an extent on SSD is effectively "virtualized" by its mapped extent key (i.e., extent store layer mappings) such that relocation of the extent on SSD does not require update to volume layer metadata (i.e., the extent key sufficiently identifies the extent). The virtualization of the storage locations also permits update processes (e.g., cleaning) to occur in the extent store layer without update to volume layer metadata, thereby allowing parallel operations among the layers as well as substantially reducing write amplification.

In an embodiment, the mappings of the extent keys to SSD storage locations are performed and maintained by the extent store layer, while the mappings of the LUN offset ranges to the extent keys are performed and maintained by the volume layer. Separation of these mapping functions between the volume and extent store layers enables different volumes with different offset ranges to reference (map to) a same extent key (and thus a same extent). Notably, separation of the volume layer and extent store layer of the layered file system enables efficient performance of inline de-duplication that illustratively ensures that there is only one copy of each extent stored on the storage arrays of the cluster. Such assurance is global to the cluster as the single copy of the stored extent may span volumes and nodes of the cluster. Notably, de-duplication may be selectively applied only to data and not metadata (e.g., volume and extent store layer mappings), so as to reduce latency of metadata operations, e.g., writes of metadata. In an embodiment, selective de-duplication may be accomplished by passing a flag in a write operation to the extent store layer.

Figure 13:
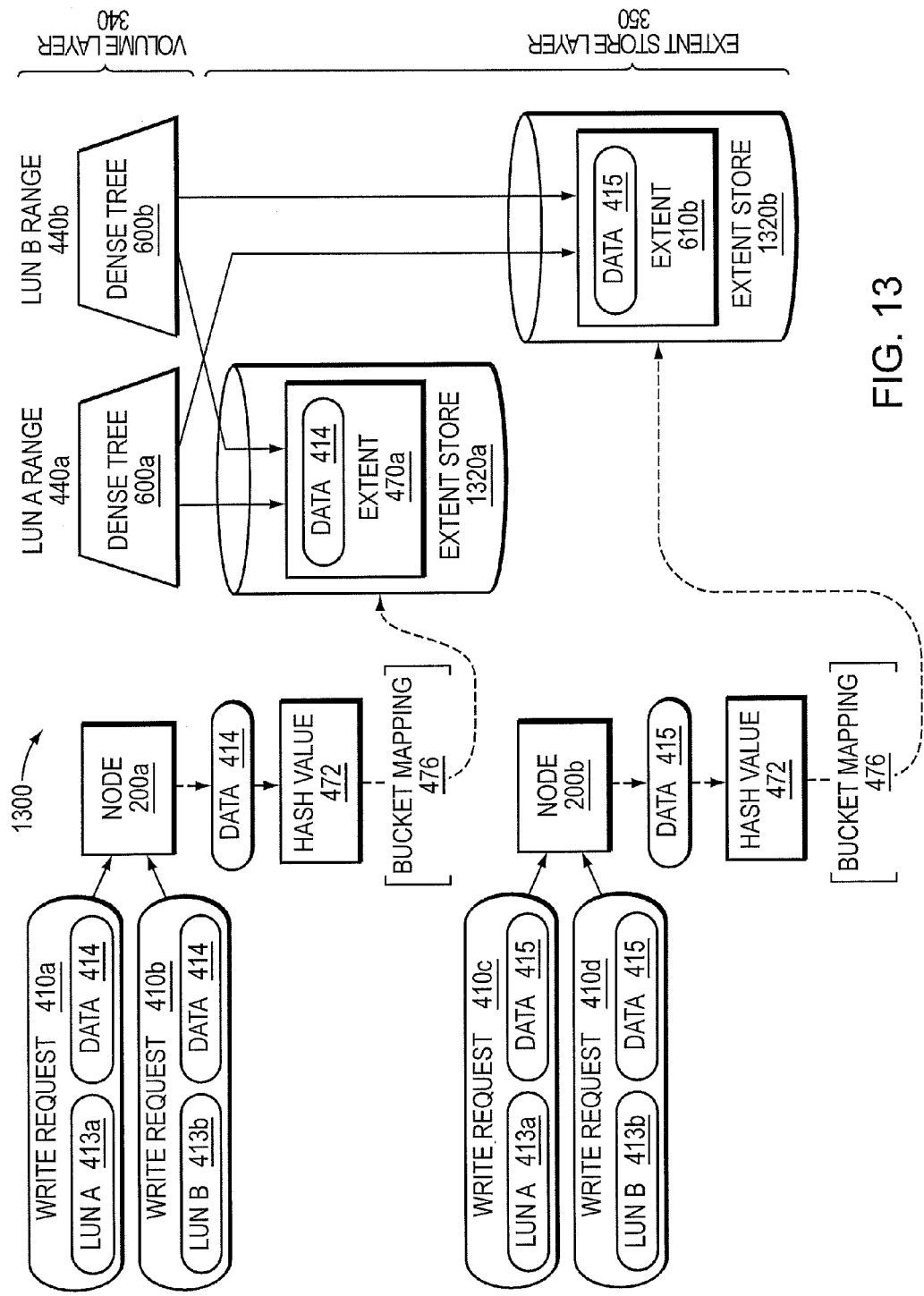
FIG. 13 is illustrates a layered file system.

FIG. 13 illustrates a layered file system that may be advantageously used with one or more embodiments described herein. A plurality of write requests 410*a,b*, each directed to a different LUN having identical write data 414, may be received by a node 200*a* of the cluster 100. An identical hash value 472*a* computed from the write data of each write request 410*a,b* may lead to inline de-duplication (i.e., de-duplication before storage on SSD, as described previously) of that data within an extent store 1320*a* (i.e., bucket). The dense trees 444*a,b* for each respective LUN (representing LUN offset ranges 440*a,b* respectively) may reference the same extent 470*a* (i.e., may store the same extent key 475, not shown). As such, a reference count in the hash table associated with the extent 470*a* may be incremented to reflect two references to the data 414 for an extent store instance associated with the extent store 1320*a*. Similarly, another plurality of write requests 410*c,d* having different identical write data 415 received by a node 200*b* of the cluster may lead to de-duplication of that data in another extent store 1320*b*. Accordingly, the bucket mapping 476 of the hash value 472 may lead to a different extent store 1320*b* for data 415 than for data 414 (which may lead to extent store 1320*a*). Again, a reference count in the hash table associated with the extent 470*b* may be incremented to reflect two references to the data 415 for an extent store instance associated with the extent store 1320*b*. Note that the dense trees 444*a,b* for each respective LUN (representing LUN offset ranges 440*a,b* respectively) may reference the same extent 470*b* (i.e., may store the same extent key 475, not shown). An extent store instance denotes an instance of an appropriate extent store layer, whereas an extent store denotes actual storage of extents on storage media (e.g., SSDs). As such, an extent store instance is akin to an extent store file system as viewed in-core, whereas an extent store is akin to that extent store file system as view on storage media.

As noted, the persistence layer 330 may compute a hash value 472 on an extent 470 to determine which extent store instance 478 (or extent store) is associated with the extent in accordance with the bucket mapping technique 476. The persistence layer may then pass the hash value 472 to the appropriate volume layer instance, which then passes on the hash value to the appropriate extent store instance via an extent store put operation. The extent store instance may determine whether the extent is previously stored on SSD in accordance with a de-duplication opportunity. If the extent is not stored on the storage arrays of the cluster (i.e., anywhere in the cluster), the extent store instance may form a unique extent key 475 from the hash value 472 prior to storing the extent (as compressed) on SSD and return that unique key to the volume layer instance. However, if it is determined that the extent is stored on any of the storage arrays in the cluster, the extent store instance may return the extent key for that stored extent to the volume layer instance, thereby enabling global inline de-duplication (i.e., de-duplication before storage on SSD) that obviates the need for a duplicate copy of the extent. Thus, the inline global de-duplication opportunity arises from (and thus provides a motivation for) the separation of the file system functions among the layers. Notably, the volume layer may be unaware of de-duplicated data stored only once in the underlying extent store layer. Facilitation of bucket mapping via a hash space and the resulting distribution of data and metadata among the extent store instances of the cluster also arise from the separation of the file system functions among the layers. That is, the volume layer is also unaware of which extent store instance stores an extent, as extent keys are global within the cluster. Thus, the benefit of inline global de-duplication of data and distribution of data (and metadata) within the cluster both result from a separation of the file system functions among the layers.

Advantageously, the separation of the volume and extent store layers permits a storage location of an extent on SSD to be effectively virtualized by its mapped extent key such that relocation of the extent on SSD does not require update to volume layer metadata (i.e., the extent key sufficiently identifies the extent). As noted, virtualization of the storage locations also permits a cleaning process to occur in the extent store layer without update to volume layer metadata, thereby substantially reducing write amplification.

Cluster-Wide Consistency Checker

The embodiments described herein are directed to a cluster-wide consistency checker configured to ensure that each layer of the layered file system of the storage I/O stack executing on each node of the cluster is self-consistent and that the layers are consistent with respect to each other. A deduplication file system (e.g., extent store) and a host-facing file system (e.g., volume layer file system) cooperate to provide the layered file system of the storage I/O stack. The deduplication file system (i.e., extent store file system) is illustratively a log-structured file system managed by the extent store layer of the storage I/O stack, whereas the host-facing file system is managed by the volume layer of the stack (i.e., volume layer file system). Illustratively, each log-structured file system (i.e., extent store) implements metadata used to identify and locate extents on storage devices as a key-value store (embodied as a hash table) and cooperates with other nodes of the cluster to provide a cluster-wide (global) key-value store. The volume layer of each node in the cluster is a client of the extent store layer (and global key-value store) that serves client requests. The consistency checker verifies and/or fixes (i.e., repairs) on-disk structures of the layered file system as a whole to ensure its consistency.

As previously described, the extent store file system (i.e., extent store instance) provides sequential storage of data and metadata (i.e., a log-structured layout) on the solid state drives (SSDs) of storage arrays in the cluster to reduce write amplification, while leveraging variable compression and variable length data features of the storage I/O stack. The data may be organized as an arbitrary number of variable-length extents of one or more host-visible logical units (LUNs) served by the nodes. The metadata may include mappings from host-visible logical block address ranges (i.e., offset ranges) of a LUN to extent keys, as well as mappings of the extent keys to SSD storage locations of the extents. The volume layer performs and maintains the mappings of the LUN offset ranges to the extent keys, while the extent store layer performs and maintains the mappings of the extent keys to SSD storage locations of the extents. As a client of the extent store (layer) and global key-value store, the volume layer may consume extents from any of the nodes in the cluster. The volume layer operates under the assumption (i.e., expects) that all extent stores and, in particular, extent store metadata (e.g., the hash table) is self-consistent. However, inconsistencies may occur in either layer. For example, there may be a situation where a key is missing from a hash table of an extent store, because, the refcount for the key was incorrectly maintained by the volume layer. In such case, the volume layer may be considered inconsistent, whereas the extent store file system (ESFS) may be considered consistent. Alternatively, there may be a situation where the extent store fails to maintain (i.e., loses or deletes) a key that the volume layer expects it to have and, thus, the ESFS is considered inconsistent, while the volume layer FS is considered consistent. In addition, there may be a situation where either the volume layer or extent store may be considered inconsistent when the extent store has a key unknown to the volume layer. In such case, storage space consumed by the unknown key is deemed a "space leak" and subject to reclamation.

In an embodiment, the consistency checker resolves such inconsistencies in accordance with the consistency checker technique that is invoked in response to a failure of a node in the cluster. For example, assume a crash recovery or power failure scenario wherein a node of the cluster crashes (fails) while I/O requests are pending and, during an attempted takeover of the failed node by a high availability (HA) partner in the cluster, the takeover activity fails. The resulting on-disk layered file system may be inconsistent because, e.g., there may be corruptions (i.e., errors) that occur during writing, reading, storage, transmission, or processing, which introduce unintended changes on-disk. Therefore, the ESFS may not be self-consistent, the volume layer file system (FS) may not be self-consistent, and both file systems may not be consistent with respect to each other. Thus, the consistency checker technique may in be invoked to verify and/or repair self-consistency for each layer of the layered file system (i.e., extent store layer and volume layer) and consistency of the layers with respect to each other.

Illustratively, the consistency checker operates as an enhanced recovery mechanism, i.e., a clustered-failover consistency checker, for the remaining (surviving) nodes of the cluster. Since the extent stores of the cluster represent a global (i.e., cluster-wide) hash space for extents storing metadata of each layer, a failed ESFS on a failed node may effectively corrupt the volume layer FS (client) on all surviving nodes of the cluster. Note that basic crash recovery from the fuzzy checkpoints for the failed ESFS (as described in U.S. Pat. No. 8,880,787 entitled Extent Metadata Update Logging and Checkpointing to Kimmel et al. issued Nov. 4, 2014) may be insufficient to avoid the corruption. Accordingly, to effect verification and repair of the layered file system as a whole, the consistency checker technique first self-checks each ESFS, then self-checks each volume layer FS, and finally checks each volume layer FS respect to the ESFSs as a whole (i.e., as a cluster-wide extent store). Note also that the file systems for the layers (i.e., extent store and volume layer) may be recovered from checkpoints according to their own respective recovery techniques (for the ESFS, as described in the above mentioned U.S. Patent Extent Metadata Update Logging and Checkpointing, and for the volume layer file system, as described in U.S. patent application by Pundir et al. entitled Reconstruction of Dense Tree Volume Metadata State Across Crash Recovery having Ser. No. 14/482,618 filed on Sep. 10, 2014). However, even though these recovery techniques may restore the respective file system to a state prior to the node failure, that prior state may already contain a corruption (and thus restore a corrupted file system); additionally a corruption (e.g., an undetected error) may occur during any of these recovery techniques.

In an embodiment, the technique is directed to execution of the consistency checker to verify and/or repair on-disk data structures of the extent store and volume layer (and persistence layer) during self-consistency checks. Accordingly, the consistency checker may implement the technique to (i) verify and/or fix (i.e., repair) on-disk data structures of each ESFS (i.e., extent store) on behalf of the affected (failed) node (i.e., on a surviving node), and replay both on-disk and NVRAM copies of the respective ESFS NVlogs to thereby render the ESFS self-consistent (and thus render the cluster-wide hash space for extents consistent); and (ii) verify and/or fix (i.e., repair) on-disk structures of each volume layer FS, as well as replay the respective volume layer NVlogs to render the volume layer FSs self-consistent. During ESFS self-consistency, all extents in the hash tables may be read to discover any out-of-scope (e.g., deleted) extents and, during volume layer FS self-consistency, the consistency checker may perform cluster-wide ESFS checks to resolve any out-of-scope extents that were discovered. Note that the volume layer FS metadata (i.e., metadata extents) may be stored on any (one or more) ESFS within the cluster. Illustratively, the volume layer may perform checks to repair dense trees and reference count metadata structures of the volume layer FSs, based on the repaired (and now self-consistent) ESFSs (and thus self-consistent cluster-wide hash space for extents).

ESFS Self-Consistency

Illustratively, the extent store metadata (e.g., hash table) is rendered (repaired) consistent (i.e., inconsistencies resolved) at the expense of data loss by ensuring compliance with formats of the metadata on-disk structures. According to the consistency checker technique, on-disk, checkpointed metadata structures are initially repaired (fixed), followed by replay of NVlogs from on-disk and then from NVRAM. Accordingly, an order of self-consistency checking for ESFS is (i) verification and/or repairs of on-disk (metadata) data structures (e.g., hash tables), (ii) replay (i.e., apply) of on-disk NVlogs, (iii) replay of NVlogs in NVRAM; and (iv) verification of (e.g., using a checksum) extents using the (now) repaired metadata structures. Illustratively, the hash tables of each ESFS are walked to access the extents and verify their existence, e.g., that they have addressable (valid) locations on SSDs (i.e., no dangling references). Also, the consistency checker may verify the extents using checksums stored with the extents at those locations. Further, on-disk structures having corrupted magic numbers in their formats may also be repaired. It should be noted that it is possible that data (user data or metadata) may be lost during the ESFS self-consistency check as a result of, e.g., the volume layer retaining keys that are out-of-scope on the extent store (e.g., not found in any hash table of the ESFS).

As previously noted (and in previously mentioned U.S. patent Extent Metadata Update Logging and Checkpointing), during fuzzy checkpointing (i.e., extent store layer metadata checkpointing), in-memory hash tables are persistently stored on SSDs as checkpoint files. The ES metadata includes an ESFS superblock, which may be read to access the checkpoint files and, in particular, index tables within the checkpoint files, i.e., hash table index metadata. Illustratively, the hash table index metadata includes an indexing table within each checkpoint file that is used to locate checkpoint pages within the file. The checkpoint pages, in turn, include the hash tables (e.g., 768 hash tables per extent store). The ESFS superblock may also be read to access NVlog metadata, including log stream pages within log stream structures (e.g., 256 log streams per extent store). According to the technique, the consistency checker attempts to traverse these data structures to ensure they are consistent. That is, the fuzzy checkpoint may be verified and/or repaired. As previously described, in one embodiment, the log stream pages may include pointers to locations of previous log stream pages on SSD, while in another embodiment, the log stream may include an indexing structure (similar to the index table of the checkpoint file) which may be traversed to ensure existence of the pages. Accordingly, a portion of the ESFS self-consistency check may occur as part of the recovery of the ESFS from the fuzzy checkpoints.

After repairing (fixing) the extent store metadata, the technique may replay the NVlogs from on-disk and NVRAM to update the repaired in-core hash tables of the extent store (i.e., extent store instance). Once all the ES metadata has been repaired and updated, the ES hash table extents are validated, e.g., existence and checksum of extent is verified. Subsequently, a checkpoint of the ES metadata (i.e., the extent store instance) may be triggered to store the verified hash tables. The ESFS may then be declared self-consistent and available (at steady state) to service read and write requests, e.g., service operations from the volume layer for checking volume layer FS self-consistency. Note that the self-consistency check of the ESFSs may be performed concurrently.

Volume Layer FS Self-Consistency

In an embodiment, a volume layer FS may include one or more volumes (e.g., host-accessible LUNs) each in a volume family (VF) that may include multiple VF members (objects) embodied, e.g., as snapshots and clones, which share metadata (e.g., dense trees or portions thereof). That is, the volume layer FS may include one or more volume families each having multiple VF members (e.g., host-accessible LUNs). Illustratively, the consistency checker repairs (fixes) the volume layer FS on-disk data structures (e.g., dense trees and refcounts) for the volume family (e.g., VF members of the volume layer FS that share metadata). Illustratively, repairing the dense tree data structure that is shared among snapshots and clones includes walking those data structures (i.e., metadata entries) representing the dense tree for the volume and its associated VF members. In addition, attributes (e.g., name, superblock location) of the volumes and VF members (e.g., snapshots, clones) may be maintained (e.g., VF identifier) in the cluster database (DB) and used by the consistency checker to identify and locate these members (objects) for verification and/or repair.

Illustratively, for each volume family (i.e., volume layer FS), the volume superblock is read to retrieve the respective dense tree region structures and load in-core (i.e., page in) the level 0 (L0), level 1 (L1), and level 2 (L2) headers. The consistency checker loads the headers from top to bottom (i.e., initially L0, then L1, and lastly L2 metadata entries) and repairs those headers from bottom to top, (i.e., first the L2 entries, second the L1 entries relative to L2, and third the L0 entries relative to L1). Where there sharing of levels among VFs, the level refcounts are repaired for that level. The consistency checker walks the dense tree data structures (headers and entries) to ensure their self-consistencies by verifying and repairing, e.g., the VF identifier (ID), checksum and magic numbers. Once the on-disk self-consistency of the volume layer FS is established, the volume layer NVlogs (on-disk and in NVRAM) may be replayed on top of the on-disk structures. In addition, the ESFS superblock may be read to access outstanding (i.e., unapplied) exactly-once-semantic (EOS) logs that the volume layer may replay. That is, the outstanding EOS logs may be used to patch additional inconsistencies in the volume layer FS once the volume layer NVlogs are replayed. In an embodiment, the EOS logs may be indexed similar to the on-disk NVlog data structures (e.g., log streams), and verified to ensure correct checksums (e.g., CRCs) and formats. Note that the self-consistency check of the volume layer FSs may be performed concurrently.

Once the volume layer FS is rendered self-consistent, verification and/or repair of inconsistencies between the extent store layers and volume layer with respective to each other may be performed using a Map Reducer Engine (MRE). As previously described, extents (user data) may be shared among volumes in different volume layer FSs. That is, an extent may be de-duplicated and stored in a single ESFS, yet be referenced in a plurality of different volume layer FS s.

MRE Publish

Figure 14:
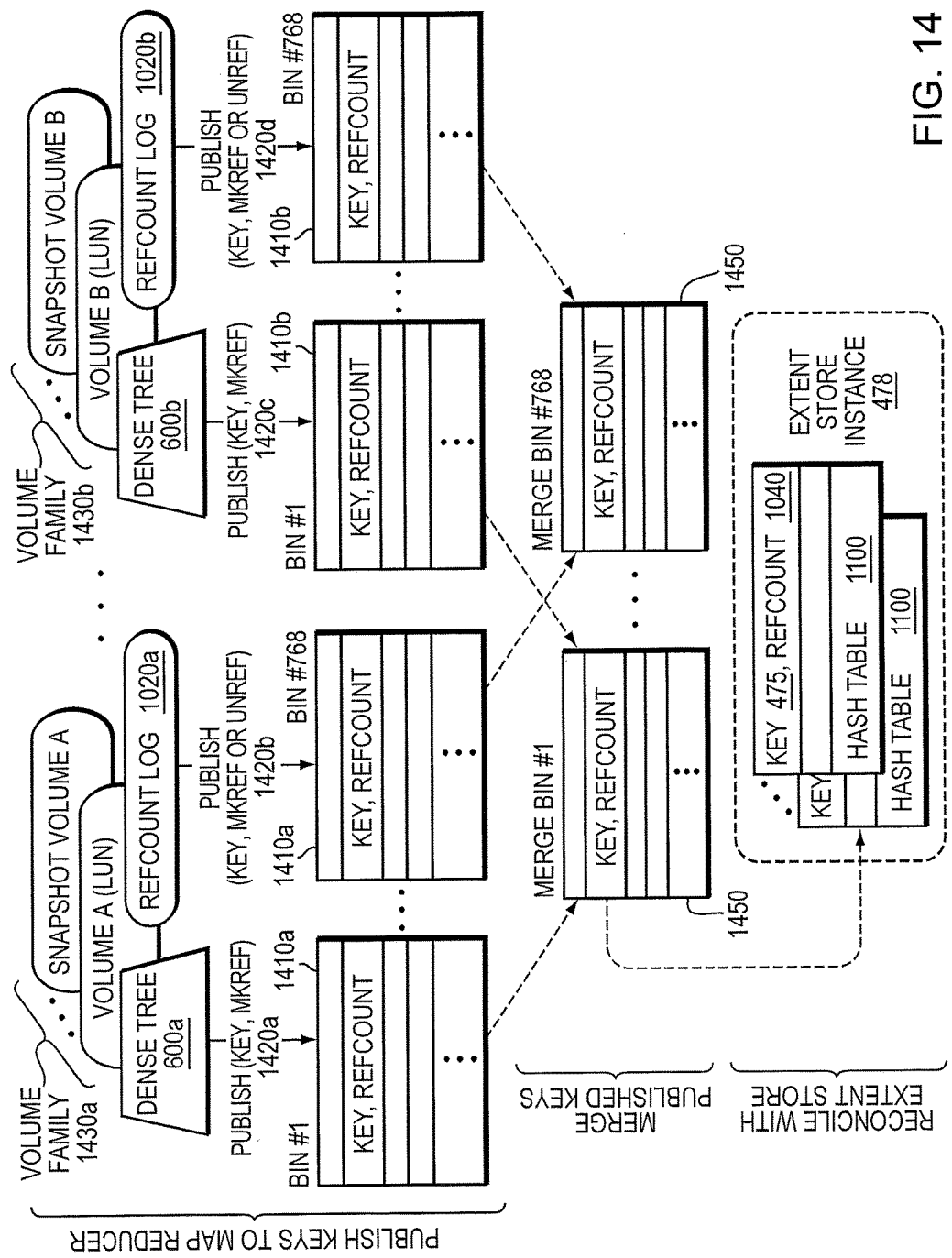
FIG. 14 illustrates a flow diagram for checking extent keys of the layered file system.

FIG. 14 illustrates a flow diagram for checking extent keys of the layered file system. In an embodiment, during volume layer FS self-consistency verification and repair (i.e., while walking the dense trees), each extent key (user and data) encountered may be published 1420*a, b, c, d* to a Map Reduce (MR) bin 1410. Each MR bin is associated with a corresponding hash table of an extent store. Accordingly, a maximum number of MR bins is equal to a number of hash tables (e.g., 768) for each extent store. Illustratively, each MR bin 1410 (e.g., BIN #1 through BIN #768) may be embodied as a key-value store, wherein the key is an extent key and the value is a reference count for the associated key, e.g., a pseudo extent store hash table. As the volume layer FS (and associated refcount log) self-consistency check may be performed concurrently, a number (e.g., 8) of concurrent processes (sources) may contribute to the MR bins, e.g., MR bins 1410*a* for a first source and MR bins 1410*b* for a second source.

In an embodiment, a separate volume family 1430*a, b* (or independent portions of a volume) may be processed (i.e., self-consistency check) in parallel by each source. The self-consistency check for each volume layer FS may also include processing the associated refcount log 1020*a,b*. Illustratively, the consistency checker publishes keys (both metadata and user data keys) within the dense trees 600*a,b* of each volume layer, as well as keys from the refcount logs 1020*a,b*, to these MR bins 1420*a,b*. Publishing of keys from the dense trees involves retrieving each key from a dense tree (i.e., walking all entries of the dense tree) and incrementing that key, e.g., +1 published as a MKREF ("make reference"), to the MR bin, which means that the dense tree (i.e., the associated entry in the dense tree) is holding a reference to the key. Similarly, publishing of keys from the refcount logs involves retrieving each key from a log and updating the MR bin associated with that key. Note that an initial publication of a key to an MR bin 1410*a* adds that key and an associated default reference count (e.g., 1) to that bin.

In an embodiment, a key may be published (at 1420*a, b, c, d*) to the MR bin using a put-like operation, which employs the bucket mapping technique (to identify the extent store) and the hash table index to identify the MR bin associated with the hash table of the extent store corresponding to the MR bin. Illustratively, a PUT API for Map Reducer publishing (at 1420*a, b, c, d*) includes a key and its reference count, wherein an MR bin may be dynamically created for a first key published to that MR bin. As previously noted, the refcount log may be a deferred update log, i.e., the refcount log structures have a collection of deferred updates, such as MKREF or UNREF ("un-reference"). Each MKREF recorded in the refcount log is published to the MRE against the key as, e.g., −1, because it is a deferred increment already updated in the volume layer FS, but as yet unapplied to the ESFS. Conversely, every UNREF recorded in the refcount log is published against the key as, e.g., +1, to the MRE.

In an embodiment, the 768 MR bins are staged in scratch files organized as a temporary file system (TFS) spread across the nodes, such that the scratch file for each respective MR bin is managed on thenode (destination node) to which that bin maps, e.g., via the bucket mapping technique 476. The TFS may be resident on reserved storage space of the extent store. Each volume layer may use a destination node extent store to provide the reserved space for the TFS.

Note that not all of the published keys to the MRE may be maintained in-core. Illustratively, the published keys are initially kept in memory, but after reaching a defined threshold (e.g., a size of a key-value store of the associated MR bin), the keys may be written to the TFS on the extent stores of the respective destination node. Note also that the keys of respective extent stores may be maintained in the memory of the node for that extent store and then written to the TFS on that extent store. Further, the reserved area of the extent store for the TFS may not be persistent across reboots, e.g., in the event of a crash, such that the TFS is lost and consistency checking starts anew. Illustratively, no metadata specifically references the TFS which is stored in the extent store that has a log structured format; as such, the TFS may be used anew upon reboot.

MRE Merge

After the volume layers of all nodes are finished publishing their keys (i.e., all keys of each volume layer FS are published), a merge operation is performed of all MR bins. As noted, each source (e.g., concurrent process) may instantiate an MRE having a maximum set of 768 MR bins (i.e., one for each corresponding ESFS hash table). Further, there may be a number (e.g., 8) of sources for each volume layer, such that the number of MR bins (one for each source) may be merged for the set of MR bins into a merged set of MR bins 1450, e.g., merging 8 concurrent MR bins 1410*a,b* for each bin (e.g., Bin #1) in the set of 768 MR bins to form the merged set of MR bins 1450. In accordance with the MRE merge phase, all of the bins are merged (i.e., accumulated) to provide a complete view of each key's reference count, i.e., the reference counts in the concurrent MR bins for each key are accumulated into a merged key in the merged set of MR bins (i.e., in the MRE).

MRE Reconciliation

In an embodiment, the consistency checker then reconciles any inconsistencies by applying the volume layer's (i.e., client's) perspective of each key's reference count to the ESFS by conforming the ESFS reference count for each key to the client's perspective. Illustratively, the reference count for each key in the MRE (i.e., merged MR bins) is compared with the corresponding reference count in the hash tables of the ES to determine whether the reference count matches. If it does not, the MRE refcount is stored in ES hash table (i.e., ES conforms to the volume layer), and any stray keys/references (i.e., key found in the ES hash table, but not in the MRE) may be garbage collected allowing associated extent storage space to be reused. Note that the extent store may have excess keys, e.g., from deferred refcount logs not yet processed (i.e., UNREF of a key). Since the volume layer publishes the keys that are available in the volume layer, there should not be a situation where the MRE has a key of which the extent store unaware. Accordingly, the set of keys in the ESFS is a superset of the keys in the MRE (i.e., merged set of MR bins) so that the extent store may discard (i.e., purge) any excess keys that are not in the MRE subset.

Illustratively, during MRE reconciliation, the consistency checker may discover that an MRE refcount for a key differs from the ES refcount for that key. When the refcount for the key is greater than it should be, this is a (repairable) space leak, yet when the refcount for the key is less than it should be, this is a (irreparable) data loss situation. Note that when the refcount for the key is what is should be, this is a still a repairable situation, but without data loss. In addition, when the key has no reference in the volume layer (which leads to it being garbage collected), this is also a (repairable) space leak. In any event, the consistency checker repairs the on-disk data structures (including the reference counts of the resulting merged MR bin keys) from the volume layer (client) perspective. In the case of data loss, the on-disk data structures are still modified from the volume layer (client) perspective, albeit with appropriate administrative logging of the event.

Post MRE Reconciliation

Post MRE reconciliation, each ESFS may trigger shutdown to persist (i.e., flush) any repairs (fixes) made (generated) during reconciliation. After all the ESFS's have shut down, the cluster-wide layered file system is expected to be consistent. Additionally, in an embodiment, the NVlogs 335 of the persistence layer may be replayed after establishing self-consistency in the volume layer and completing reconciliation. Replay of the persistence layer logs essentially involves issuing pending write (I/O) operations that are retained in the NVlog as described in U.S. Pat. No. 8,806,115 entitled NVRAM Data Organization Using Self-Describing Entries for Predictable Recovery After Power-loss to K. Patel et al. and issued on Aug. 12, 2014. Note that replay of the persistency layer NVlogs is desirable because the persistence layer may function as a cache of host (user) data, which should not be discarded. After replaying the persistence layer NVlogs (in NVRAM) the cluster-wide layered file system consistency check may be declared complete.

Figure 15:
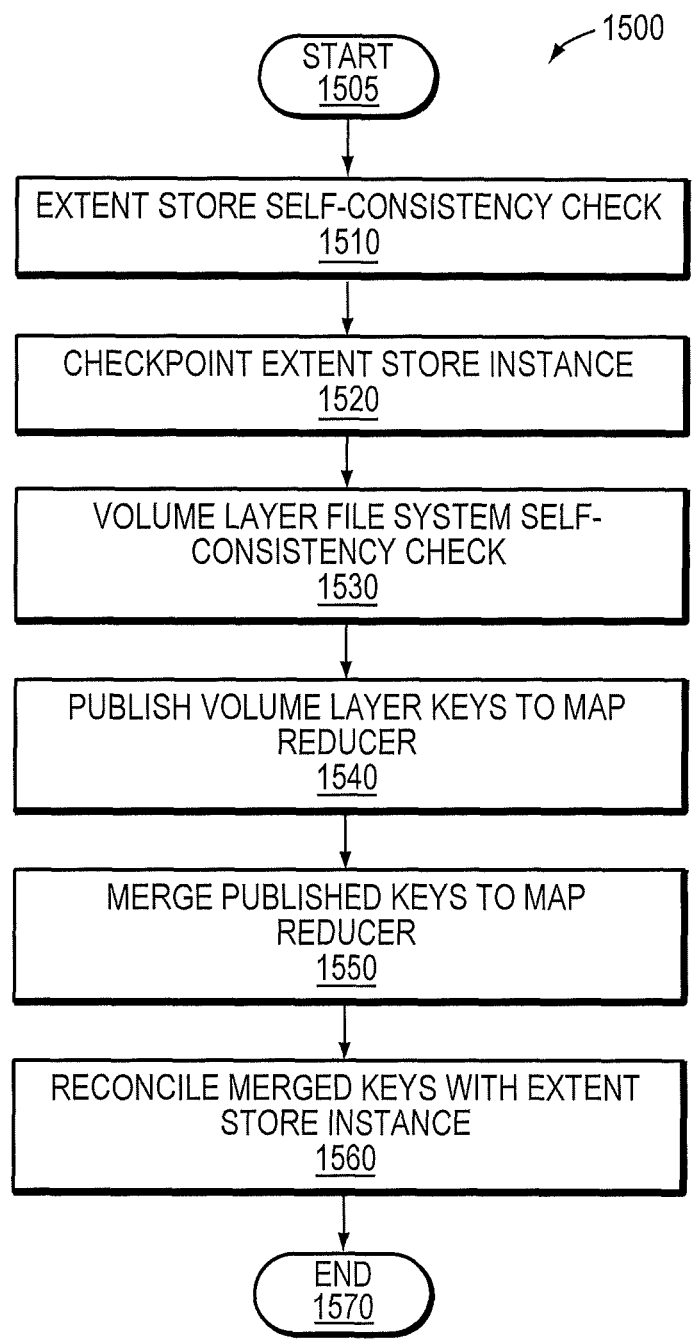
FIG. 15 is a simplified procedure of a consistency checker for the layered file system.

FIG. 15 is a simplified procedure 1500 of a consistency checker for the layered file system. Illustratively, the procedure begins at step 1505 and proceeds to step 1510 where a self-consistency check is performed in each extent store file system (i.e., key-value store) to verify and/or fix its on-disk structures using, e.g., an in-core extent store instance. Once the self-consistency check for the extent store is complete, the extent store instance is then checkpointed to the on-disk extent store file system at step 1520. At step 1530, a self-consistency check is performed in each volume layer file system to verify and/or fix its on-disk structures. That is, the consistency checker may reconcile any subsequent inconsistencies (e.g., space leaks, underflow of reference counts, or out-of-scope keys) between the volume layer and extent store file systems using the MRE to fix references to the keys from the volume layer (i.e., client) perspective. That is, the consistency checker may verify and repair the extent store metadata of the layered file by checking consistency across the layers, e.g., ensuring that keys in the volume layer are consistent with keys in the extent store layer. At step 1540, extent keys from the volume layer file systems may be published to the MRE and, at step 1550, the extent keys are merged so that accumulated reference counts for keys in the volume layer may be reconciled with reference counts for corresponding keys the extent store at step 1560. The procedure then ends at step 1570. Note that the cluster may be brought down (i.e., the layered file system placed offline such that host I/O requests are ignored), the extent store (ESFS) of the affected (failed) node mounted, and the consistency checker run offline. Alternatively, the consistency checker may be run while the layered file system is online with restricted write operations (e.g., read-only).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
checking self-consistency of first on-disk data structures of an extent store, in response to recovery of a layered file system, the extent store included as a first layer of the layered file system serviced by a storage system coupled to one or more storage devices storing extents of the extent store, the first on-disk data structures of the extent store including one or more hash tables configured to maintain an extent key and a reference count for each of the extents;
checking self-consistency of second on-disk data structures of a volume layer in response to the recovery of the layered file system, the volume layer included as a second layer of the layered file system, the second on-disk structures of the volume layer including one or more dense tree structures configured to maintain mappings from host-accessible logical unit number (LUN) addresses to the extent keys; and
reconciling, for each extent key in the volume layer mappings, the reference count of a same extent key maintained in the extent store.

2. The method of claim 1 wherein checking the self-consistency of the extent store further comprises repairing the reference count for a de-duplicated extent.

3. The method of claim 1 wherein checking the self-consistency of the extent store further comprises validating an addressable location for each extent of the extent store.

4. The method of claim 1 further comprising:
publishing each extent key maintained in the volume layer mappings to a first set of map reducer bins, wherein each map reducer bin is a key-value store maintaining the extent key as a key of the key-value store and the reference count as a value of the key-value store.

5. The method of claim 4 further comprising:
merging the first set of map reducer bins associated with a first host-accessible LUN with a second set of map reducer bins associated with a second host-accessible LUN; and
reconciling for each extent key of a merged result of the first and second sets of map reducer bins, the reference count of the same extent key maintained in the extent store.

6. The method of claim 4 wherein publishing the extent key maintained in the volume layer to the first set of map reducer bins increases the reference count of the same extent key maintained in the key-value store of the map reducer bin.

7. The method of claim 4 further comprising:
publishing to the first set of map reducer bins, a refcount log extent key maintained in a refcount log for unreferencing an extent of the extent store, wherein update to the extent store from the refcount log is deferred; and
increasing the reference count of the extent key for the unreferenced extent maintained in the key-value store of the map reducer bin.

8. The method of claim 1 wherein the checked extent store is written to the storage devices.

9. The method of claim 4 wherein the mappings of the volume layer are maintained in a plurality of regions, and wherein each extent key maintained in the volume layer mappings per region is published in parallel with other regions.

10. The method of claim 1 wherein reconciling each extent key in the volume layer mappings is performed while the layered file system is offline.

11. A system comprising:
a storage array coupled to a storage system, the storage system having a memory connected to a processor via a bus;
a storage input/output (I/O) stack executing on the processor of the storage system, the storage I/O to stack configured to:
check self-consistency of first on-disk data structures of an extent store, in response to recovery of a layered file system, the extent store included as a first layer of the layered file system executed by the storage I/O stack, the storage array storing extents of the extent store, the first on-disk data structures of the extent store configured to maintain an extent key and a reference count for each of the extents;
check self-consistency of second on-disk data structures of a volume layer in response to the recovery of the layered file system, the volume layer included as a second layer of the layered file system, the second on-disk structures of to the volume layer including one or more dense tree structures configured to maintain mappings from host-accessible logical unit number (LUN) addresses to the extent keys; and
reconcile, for each extent key in the volume layer mappings, the reference count of a same extent key maintained in the extent store.

12. The system of claim 11 wherein checking the self-consistency of the extent store further comprises repairing the reference count for a de-duplicated extent.

13. The system of claim 11 wherein checking the self-consistency of the extent store further comprises validating an addressable location for each extent of the extent store.

14. The system of claim 11 wherein the storage I/O stack is further configured to:
publish each extent key maintained in the volume layer mappings to a first set of map reducer bins, wherein each map reducer bin is a key-value store maintaining the extent key as a key of the key-value store and the reference count as a value of the key-value store.

15. The system of claim 14 wherein the storage I/O stack is further configured to:
merge the first set of map reducer bins associated with a first host-accessible LUN with a second set of map reducer bins associated with a second host-accessible LUN; and
reconcile, for each extent key of a merged result of the first and second sets of map reducer bins, the reference count of the same extent key maintained in the extent store.

16. The system of claim 14 wherein publishing the extent key maintained in the volume layer to the first set of map reducer bins increases the reference count of the same extent key maintained in the key-value store of the map reducer bin.

17. The system of claim 14 wherein the storage I/O stack is further configured to:
publish to the first set of map reducer bins, a refcount log extent key maintained in a refcount log for unreferencing an extent of the extent store, wherein update to the extent store from the refcount log is deferred; and
increase the reference count of an extent key for the unreferenced extent maintained in the key-value store of the map reducer bin.

18. The system of claim 11 wherein the checked extent store is written to the storage array.

19. The system of claim 14 wherein the mappings of the volume layer are maintained in a plurality of regions, and wherein each extent key maintained in the volume layer mappings per region is published in parallel with other regions.

20. A non-transitory computer readable storage medium containing executable program instructions for execution by a processor included in a storage system having a memory, the storage system coupled to one or more storage devices, comprising program instructions that:
check self-consistency of first on-disk data structures of an extent store, in response to recovery of a layered file system, the extent store included as a first layer of the layered file system, the one or more storage devices storing extents of the extent store, the first on-disk data structures of the extent store including one or more hash tables configured to maintain an extent key and a reference count for each of the extents;
check self-consistency of second on-disk data structures of a volume layer in response to the recovery of the layered file system, the volume layer included as a second layer of the layered file system, the second on-disk structures of the volume layer including one or more dense tree structures configured to maintain mappings from host-accessible logical unit number (LUN) addresses to the extent keys;
publish each extent key maintained in the volume layer mappings to a first set of map reducer bins, wherein each map reducer bin is a key-value store maintaining one of the extent keys as the key and a reference count as the value;
merge the first set of map reducer bins associated with a first host-accessible LUN with a second set of map reducer bins associated with a second host-accessible LUN; and
reconcile, for each extent key of a merged result of the first and second sets of map reducer bins, the reference count of a same extent key maintained in the extent store.

* * * * *